(12) United States Patent
McCann et al.

(10) Patent No.: US 12,131,301 B2
(45) Date of Patent: *Oct. 29, 2024

(54) AUTOMATED PERFORMANCE OF PARAMETER-BASED OPERATIONS IN TRUSTED NETWORK ENVIRONMENTS

(71) Applicant: The Toronto-Dominion Bank, Toronto (CA)

(72) Inventors: Stephen John McCann, Toronto (CA); Perry Aaron Jones Haldenby, Toronto (CA); Arthur Carroll Chow, Toronto (CA); Eddie Cheuk Long Law, Toronto (CA); Haituyen Anthony Nguyen, Toronto (CA); Paul Mon-Wah Chan, Toronto (CA); John Jong Suk Lee, Toronto (CA); Rakesh Thomas Jethwa, Toronto (CA)

(73) Assignee: The Toronto-Dominion Bank, Toronto (CA)

( * ) Notice: Subject to any disclaimer, the term of this patent is extended or adjusted under 35 U.S.C. 154(b) by 157 days.

This patent is subject to a terminal disclaimer.

(21) Appl. No.: 17/386,158

(22) Filed: Jul. 27, 2021

(65) Prior Publication Data

US 2021/0357886 A1 Nov. 18, 2021

Related U.S. Application Data

(63) Continuation of application No. 15/349,274, filed on Nov. 11, 2016, now Pat. No. 11,107,050.

(51) Int. Cl.
*G06Q 20/10* (2012.01)
*G06Q 20/38* (2012.01)
(Continued)

(52) U.S. Cl.
CPC ....... *G06Q 20/102* (2013.01); *G06Q 20/1085* (2013.01); *G06Q 20/385* (2013.01);
(Continued)

(58) Field of Classification Search
CPC ............. G06Q 20/401; G06Q 20/1085; G06Q 20/4014; G06Q 20/18; G06Q 20/223;
(Continued)

(56) References Cited

U.S. PATENT DOCUMENTS 7,680,738 B2 3/2010 Amann et al.
7,707,107 B2 4/2010 Gebb et al.
(Continued)

FOREIGN PATENT DOCUMENTS

EP 1093097 4/2001

OTHER PUBLICATIONS

Parikh, "ATM and Its Alternative Uses," Nov. 16, 2009 (4 pages).
(Continued)

*Primary Examiner* — Hao Fu
(74) *Attorney, Agent, or Firm* — Duane Morris LLP

(57) ABSTRACT

The disclosed embodiments include computer-implemented systems and processes that facilitate an initiation and a performance of one or more trustless transactions between counterparty devices operating within a trusted, secure computer-networking environment. For example, an apparatus may receive, through a touchscreen display unit, first data that identifies a session identifier associated with a transaction session, and may determine a validity of the session identifier based on the received first data. The apparatus may establish the transaction session in response to the determined validity of the session identifier. The transaction session may be associated with first and second operations characterized by values of corresponding parameters. The apparatus may receive, through the touchscreen display unit,
(Continued)

second data confirming a completion of the first operation, and in response to the confirmation of the completed first operation, the apparatus may perform the second operation in accordance with at least a portion of the parameter values.

18 Claims, 7 Drawing Sheets

(51) Int. Cl.
| | | |
|---|---|---|
| *G07F 19/00* | (2006.01) | |
| *H04L 9/40* | (2022.01) | |
| *H04L 67/104* | (2022.01) | |
| *H04L 67/14* | (2022.01) | |

(52) U.S. Cl.
CPC ............ *G07F 19/206* (2013.01); *H04L 63/08* (2013.01); *H04L 67/104* (2013.01); *H04L 67/14* (2013.01); *G07F 19/207* (2013.01); *H04L 2463/102* (2013.01)

(58) Field of Classification Search
CPC ........ G06Q 20/10; G06Q 20/38; G06Q 20/40; G06Q 30/06
See application file for complete search history.

(56) References Cited

U.S. PATENT DOCUMENTS

| | | | |
|---|---|---|---|
| 7,766,223 B1 | 8/2010 | Mello et al. | |
| 8,632,000 B2 | 1/2014 | Laracey | |
| 8,881,977 B1 | 1/2014 | Paczkowski et al. | |
| 9,853,759 B1 | 12/2017 | Rae et al. | |
| 9,955,318 B1* | 4/2018 | Scheper ................. | G06Q 10/02 |
| 2008/0195499 A1 | 8/2008 | Meredith et al. | |
| 2008/0255993 A1 | 10/2008 | Blinbaum | |
| 2011/0184838 A1 | 7/2011 | Winters et al. | |
| 2012/0047070 A1 | 2/2012 | Pharris | |
| 2013/0018787 A1 | 1/2013 | Andrews et al. | |
| 2015/0142647 A1 | 5/2015 | Johnson et al. | |
| 2015/0254642 A1* | 9/2015 | Bondesen .......... | G06Q 20/4016 |
| | | | 705/41 |
| 2016/0012465 A1 | 1/2016 | Sharp | |
| 2017/0116603 A1* | 4/2017 | Bogaard ................ | G06Q 20/02 |
| 2017/0357964 A1* | 12/2017 | Subrahmanyam .......................... | |
| | | | G06Q 20/3674 |
| 2018/0089680 A1* | 3/2018 | Castinado .......... | G06Q 20/4014 |

OTHER PUBLICATIONS

King, "Growing P2P Marketplace Through Evolved Fraud Management," Nov. 10, 2015 (3 pages).

Mirani, "What is the future of the ATM in a world of digital money?," Apr. 13, 2015 (6 pages).

"Yes Bank secures mobile payment transactions with data encryption solution from Gemalto," Jul. 20, 2016 (3 pages).

Wilson, "Mobile Payments, Transactions & Authentication," presented at the Oct. 26, 2012, seminar of the Federation of Security Professionals (23 pages).

* cited by examiner

AUTOMATED PERFORMANCE OF PARAMETER-BASED OPERATIONS IN TRUSTED NETWORK ENVIRONMENTS

CROSS-REFERENCE TO RELATED APPLICATION

This application is a continuation of, and claims the benefit of priority to, U.S. application Ser. No. 15/349,274, filed Nov. 11, 2016, the disclosure of which is expressly incorporated herein by reference to its entirety.

TECHNICAL FIELD

The disclosed embodiments generally relate to computer networking, and in particular, processes that automatically perform parameter-based operations within trusted networking environments.

BACKGROUND

Unstructured, peer-to-peer (P2P) transactions, in which individuals trade or sell items through various digital platforms, are increasing common in today's economy. The increasing commonality of P2P transactions also highlights certain pitfalls associated these unstructured and often-personal interactions, such as a lack of knowledge or trust among counterparties and a risk that one party lacks funds or goods promised to complete the transaction in accordance with the agreed-upon terms.

SUMMARY

The disclosed embodiments include computer-implemented systems and processes that facilitate an initiation and a performance of one or more trustless transactions between counterparty devices operating within a trusted, secure computer-networking environment. For example, and consistent with certain embodiments, an apparatus includes an input unit, a storage unit storing instructions, and at least one processor coupled to the input unit and the storage unit. The at least one processor may be further configured to execute the instructions to receive, through the input unit, first data that includes a first session identifier. In one aspect, the first session identifier may be associated with a data exchange session. The at least one processor may be further configured to execute the instructions to determine that the first session identifier represents a valid session identifier, and establish the data exchange session in response to the determination. The data exchange session may, in certain aspects, be associated with first and second operations characterized by values of corresponding parameters. The at least one processor may be further configured to execute the instructions to receive, through the input unit, second data confirming a completion of the first operation, and in response to the confirmation of the completed first operation, perform the second operation in accordance with at least a portion of the parameter values.

In other embodiments, a computer-implemented method may include receiving, by at least one processor, and through an input unit of an apparatus, data that includes a session identifier. In one aspect, the session identifier being associated with a data exchange session. The computer-implemented method may also include determining, by the at least one processor, that the session identifier represents a valid session identifier, and establish, by the at least one processor, the data exchange session in response to the determination. The data exchange session may, in some aspects, be associated with first and second operations characterized by values of corresponding parameters. Further, the computer-implemented method may include receiving by the at least one processor, and through the input unit, second data confirming a completion of the first operation, and in response to the confirmation of the completed first operation, performing, by the at least one processor, the second operation in accordance with at least a portion of the parameter values.

Additionally, in some embodiments, and apparatus may include an input unit, a storage unit storing instructions, and at least one processor coupled to the input unit and the storage unit. The at least one processor may be configured to execute the instructions to receive a request to schedule a data exchange session from a first device. In one aspect, the data exchange session may be associated with an operation, and the request comprising first candidate parameter values for the operation. The at least one processor may be further configured to execute the instructions to receive second candidate parameter values for the operation from a second device, establish common parameter values for the operation. The common parameter values may, in some aspects, included within the first and second candidate parameter values. The at least one processor may be further configured to execute the instructions to assign the data exchange session to a computing system available at a corresponding date and time, generate session identifiers that associate corresponding ones of the first and second devices to the assigned data exchange session and the common parameter values, and transmit scheduling data associated with the assigned data exchange session to the computing system. The scheduling data may identify corresponding date and time assigned to the data exchange session and data identifying the first and second devices.

It is to be understood that both the foregoing general description and the following detailed description are exemplary and explanatory only and are not restrictive of the invention, as claimed. Further, the accompanying drawings, which are incorporated in and constitute a part of this specification, illustrate aspects of the present disclosure and together with the description, serve to explain principles of the disclosed embodiments as set forth in the accompanying claims.

DETAILED DESCRIPTION

Figure 1:
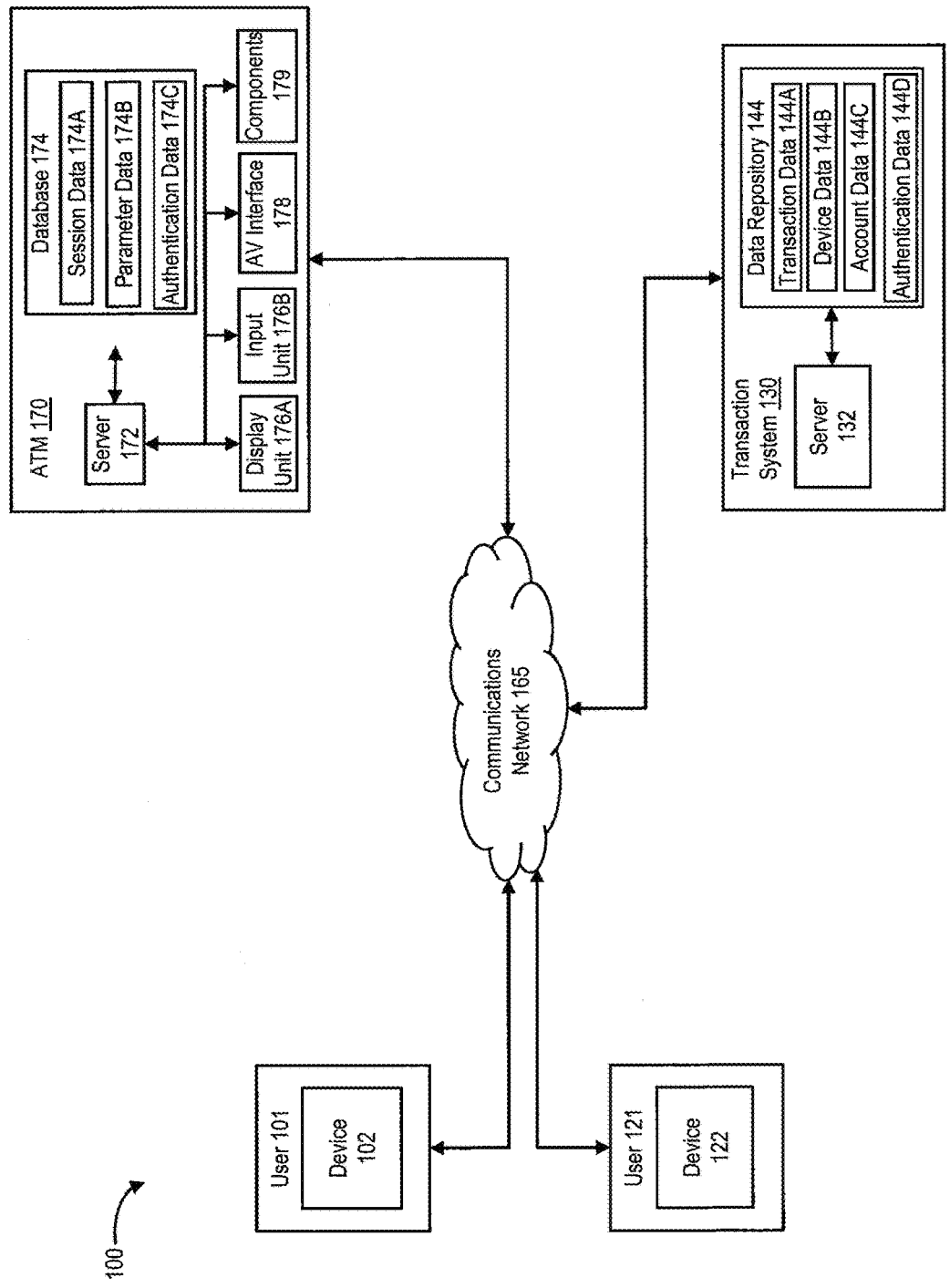
FIG. 1 is a diagram of an exemplary computing environment, consistent with disclosed embodiments.

Reference will now be made in detail to the disclosed embodiments, examples of which are illustrated in the accompanying drawings. The same reference numbers in the drawings and this disclosure are intended to refer to the same or like elements, components, and/or parts.

In this application, the use of the singular includes the plural unless specifically stated otherwise. In this application, the use of "or" means "and/or" unless stated otherwise. Furthermore, the use of the term "including," as well as other forms such as "includes" and "included," is not limiting. In addition, terms such as "element" or "component" encompass both elements and components comprising one unit, and elements and components that comprise more than one subunit, unless specifically stated otherwise. Additionally, the section headings used herein are for organizational purposes only, and are not to be construed as limiting the described subject matter.

This specification describes exemplary computer-implemented systems and processes that facilitate an initiation and a performance of one or more trustless exchanges of data between counterparty devices operating within a trusted, secure computer-networking environment. In some aspects, the one or more trustless data exchanges may include a peer-to-peer (P2P) transaction that enables an individual to trade or sell various goods or services to other individuals, e.g., counterparties. For example, in some P2P transactions, the individual, e.g., a seller, may establish contact with one or more counterparties, e.g., buyers, through various digital channels, such as social networking platforms, web-based classified, and/or web-based marketplaces or auctions, and additionally or alternatively, through direct contact at swap meets or conventions, and the seller and buyer may negotiate terms for these P2P transactions directly through electronic communication (e.g., email, text-message, etc.) or face-to-face interaction. These negotiated terms may, in certain instances, establish an agreement by which the seller agrees to deliver certain goods or services to the one or more buyers in exchange for specified payment.

Certain of these P2P transaction may be "trustless" transactions because the seller and one or more buyers do not rely on a trusted, third-party computing system to monitor and enforce compliance with the terms of the established agreement, such as a computing system maintained by a financial institution, web-based marketplace or auction, or other third-party known to and trusted by the seller and one or more buyers. Instead, the seller and one or more buyers may rely on their respective counterparties, who may be mutually unknown to the seller and/or the one or more buyers, to perform in accordance with the terms of the agreement, e.g., that the seller provide the agreed-upon goods or services and the buyers provide the agreed-upon funds to the seller upon delivery of the goods or services. Further, processes that enforce the agreed-upon terms of the trustless, P2P transactions, such as return policies or dispute management protocols, may be implemented by the third-party computer systems upon completion of the P2P transactions, and may result in a delayed decision (e.g., requiring twenty-four hours to three months of consideration) that pleases none of the parties to the P2P transaction.

As described below, the disclosed embodiments may enable the seller and the one or more buyers to rely on trusted, third-party computing network, such as an automated-teller machine (ATM) network, to enable the trustless, P2P transactions described above to occur in both a physically and financially secure manner. For example, the seller and a corresponding one of the buyers may be capable of accessing an ATM within the ATM network, e.g., using corresponding personal identification numbers (PINs) assigned by one or more financial institutions. In certain aspects, a transaction system associated with that ATM network may establish communications with devices operated by the seller and the buyer, and based on data exchanged between these devices and the transaction system, may establish mutually agreeable terms for a P2P transaction involving the seller and the buyer. The transaction system may also generate unique seller- and buyer-specific session identifiers associated with the P2P transaction and the established terms, and may assign the P2P transaction to a particular ATM for completion by the seller and buyer at mutually agreeable time. The transaction system may transmit, to the seller and buyer devices, data that identifies the assigned ATM, the agreed-upon transaction time and date, and corresponding ones of the seller- and buyer-specific session identifiers.

In some aspects, and as described below, the seller and buyer may arrive at the assigned ATM on the agreed-upon transaction date and time, and provide input to the ATM that identifies each of the seller- and buyer-specific session identifiers (e.g., through an input unit of the ATM, such as a keypad, or by establishing communications between the ATM and corresponding ones of the seller and buyer devices). Based on the inputted session identifiers, the ATM may obtain the agreed-upon terms of the P2P transaction from the transaction system, and may perform operations that monitor the activities of the buyer and seller in conducting the P2P transaction (e.g., by capturing digital images or video of an area surrounding the ATM, within which the seller and the buyer conduct the P2P transaction). Upon completion of the P2P transaction, the buyer, and additionally or alternatively, the seller, may input corresponding assigned PIN, the verification of which may cause the ATM to perform operations compensate the seller in accordance with the established terms of the P2P transaction, e.g., by disbursing cash to the seller, by initiating a funds transfer from a buyer account to a seller account, or by initiating an email-based or text-message-based e-transfer.

In certain embodiments, the monitoring capabilities of the ATM, as triggered by the receipt of the session identifiers, may provide the seller and the buyer with a safe, monitored physical environment within which to conduct the P2P transaction. Further, by performing operations that compensate the seller in accordance with the establish terms only after receipt of the PIN assigned to the buyer, and additionally or alternatively, the seller, the disclosed embodiments may ensure that the seller and buyer both perform in accordance with the agreed-upon transaction terms of the P2P transactions. The disclosed embodiments may, in some aspects, enable one or more trustless transactions, such as P2P transactions between unknown sellers and buyers, to occur in a trusted manner that is both physically and financially secure to both the seller and the buyer.

I. Exemplary Computing Environments

FIG. 1 is a diagram illustrating an exemplary computing environment 100, consistent with certain disclosed embodiments. In some aspects, as illustrated in FIG. 1, environment 100 may include a plurality of devices, such as a device 102 and a device 122, a transaction server 140, and one or more automated teller machines (ATMs), such as ATM 170, which may be interconnected through any appropriate combination of communications networks, such as network 165.

As illustrated in FIG. 1, device 102 and device 122 may each correspond to a computing device, such as, but not limited to, a personal computer, a laptop computer, a tablet computer, a notebook computer, a hand-held computer, a personal digital assistant, a portable navigation device, a mobile phone, a smart phone, a wearable computing device (e.g., a smart watch, a wearable activity monitor, wearable smart jewelry, and glasses and other optical devices that include optical head-mounted displays (OHMDs), an embedded computing device (e.g., in communication with a smart textile or electronic fabric), and any other type of computing device that may be configured to store data and software instructions, execute software instructions to perform operations, and/or display information on a one or more display units, consistent with disclosed embodiments. Devices 102 and 122 may also include a hardware-based communications module, such as a transceiver capable of transmitting and receiving data over one or more communications networks, such as network 165. In certain embodiments, device 102 may be associated with one or more users, such as user 101, and device 122 may be associated with one or more additional users, such as user 121. For instance, users 101 and 121 may operate corresponding ones of devices 102 and 122, and may do so to cause devices 102 and 122 to perform one or more operations consistent with the disclosed embodiments.

Devices 102 and 122 may, in some aspects, include one or more tangible, non-transitory memories that store data and/or software instructions, and one or more processors configured to execute software instructions. For example, devices 102 and 122 may store, in the one or more tangible, non-transitory memories, one or more software applications that run on devices 102 and 122, and are executed by the one or more processors, such as web browsers and various applications associated with transaction system 140, as described below. Devices 102 and 122 may also include one or more display units that display information to a user (e.g., a liquid-crystal display (LCD) unit or any other type of appropriate display unit), and one or more input units to allow the user to input information to devices 102 and 122 (e.g., a keypad, a keyboard, a capacitive overlay, voice activated control technologies, or any other type of known input device). For example, the display unit may correspond to a LCD unit, and the input device may correspond to a capacitive overlay disposed on a surface of the LCD unit (e.g., a corresponding LCD screen) to form an integrated interface unit (e.g., a pressure-sensitive, touchscreen interface unit). In other aspects, and consistent with the disclosed embodiments, the input unit may include a keypad, keyboard, mouse, microphone, or other input device appropriate to devices 102 and 122, and may be separate and distinct from a corresponding display unit.

For example, users 101 and 121 (and additionally or alternatively, other users of devices operating within environment 100) may participate in a data exchange session, such as a peer-to-peer (P2P) transaction, in which user 101 agrees to sell or trade one or more goods or services to other individuals or counterparties, such as user 121, in exchange for financial compensation. In some instances, devices 102 and 122 may present, to corresponding ones of users 101 and 121, web pages or other graphical user interfaces (GUIs) associated with transaction server 140 (e.g., as generated by mobile applications executed by devices 102 and/or 122), and may receive input that specifies one or more proposed terms of the P2P transaction and further, proposed times, dates, and/or locations for completing the P2P transaction. Devices 102 and 122 may transmit the inputted information to transaction system 140 across network 165, and as described below, transaction system 140 may perform operations that establish the terms of the P2P transaction between users 101 and 121 and assign the P2P transaction to a particular one of the ATMs, e.g., ATM 170, for completion by users 101 and 121 at a mutually agreeable one of the proposed times, dates, and/or locations.

Referring back to FIG. 1, transaction system 140 may, in some aspects, represent a computing system configured to execute software instructions (e.g., one or more executable application modules) that perform operations consistent with disclosed embodiments. For example, and as described below, transaction system 140 may receive, from devices 102 and 122, data identifying the one or more proposed parameters of the P2P transaction, and further, the proposed times, dates, and/or locations for completing the P2P transaction during a corresponding transaction session. In certain aspects, and in response to the data received from devices 102 and 122, transaction system 140 may be perform operations that include, but are not limited to, assigning a unique transaction identifier to the P2P transaction, establishing parameters for the P2P transaction and associating the established transaction parameters with the unique transaction identifier, and assigning the P2P transaction to a corresponding one of the ATMs, e.g., ATM 170, for completion at a corresponding date and time, e.g., during a corresponding transaction session. Additionally, transaction system 140 may generate, and distribute to devices 102 and 122, corresponding session identifiers that unique identify each of users 101 and 121 and further, associated devices 102 and 122, and users 101 and 121, with the established transaction parameters and the corresponding transaction session.

Additionally, transaction system 140 may establish and maintain communications with ATM 170 (and with any additional or alternate ATM operating within computing environment 100) across network 165 and additionally or alternatively, across any additional or alternate communications network (e.g., a private communications network or intranet, etc.). In certain aspects, and as described below, transaction system 140 may perform operations that provide the established terms of the P2P transaction to ATM 170 in response to a receipt of the generated session identifiers, and that initiate, execute, and/or settle one or more transactions initiated by ATM 170 in accordance with the established terms of the P2P transaction (e.g., alone or in conjunction with one or more third-party computing systems). For example, transaction system 140 may be associated with one or more financial institutions holding accounts of the seller and the buyer, and transaction system 140 may perform operations that debit the buyer's account to reflect cash dispensed to the seller by ATM 170, initiate a funds transfer from the buyer account to an account of the seller, and additionally or alternatively, that initiate an email-based or text-message-based e-transfer.

Referring back to FIG. 1, transaction system 140 may include one or more servers (e.g., server 142) and tangible, non-transitory memory devices storing executable code and application modules. Further, server 142 may include one or more processor-based computing devices, which may be configured to execute portions of the stored code or application modules to perform operations consistent with the disclosed embodiments, including operations consistent with the exemplary processes described herein. In other instances, and consistent with the disclosed embodiments, transaction system 140 may correspond to a distributed system that may include computing components distributed across one or more networks, such as network 165, or other networks, such as those provided or maintained by cloud-service providers. Transaction system 140 may also include a hardware-based communications module, such as a transceiver capable to receiving and transmitting data across one or more communications networks, such as network 165.

Transaction system 140 may maintain a data repository 144 (e.g., within one or more of the tangible, non-transitory memories) that includes, among other things, transaction data 144A, device data 144B, account data 144C, and authorization data 144D. In certain aspects, and as described below, transaction data 144A may include data that uniquely identifies one or more scheduled, pending, and/or completed transaction sessions (e.g., unique transaction identifies assigned by transaction system 140 to each P2P transaction session), data identifying corresponding transaction parameters established for each of the scheduled, pending, and/or completed transaction sessions (and their associated underlying transactions), and further, data that identifies unique session identifiers assigned to each of the parties of the scheduled (or unscheduled), pending, and/or completed transaction sessions. For example, for a particular P2P transaction, transaction system 140 may generate a unique session identifier for each party to the P2P transaction, and the generated session identifiers may associate the corresponding parties with the scheduled transaction session and additionally or alternatively, to the established parameters of that P2P transaction session.

In some instances, device data 144B may include data that uniquely identifies and characterizes one or more of the devices, computing systems, and ATMs operating within environment 100. For example, device data 144B may include a unique identifier of ATM 170 (e.g., a serial number, a MAC address, an IP address, etc.), along with additional data that specifies a physical location of ATM 170 (e.g., a street address, one or more geographical coordinates, etc.) and an availability of ATM 170 to host transaction sessions. Further, account data 144C may include data that identifies one or more accounts of registered users of transaction system 140, which may be held or maintained by business entities associated with transaction system 140, such as one or more financial institutions associated with ATM 170. For instance, account data 144C may store data identifying accounts held by users 101 and 121 at one or more financial institutions (e.g., checking accounts, savings accounts, lines of credit, etc.) and establishing current balances of these identified accounts.

Authentication data 144D may, in certain aspects, include structured data records that specify authentication credentials assigned to one or more parties to the scheduled transaction sessions. For example, the structured data records of authentication data 144D may specify, for users 101 and 121, encrypted PINs, assigned session identifiers, identifiers of devices operated by users 101 and 121, and any additional or alternate authentication credentials that uniquely identify and authentication an identity of users 101 and 121 (and any other parties to the scheduled transaction sessions. The disclosed embodiments are, however, not limited to these examples of stored data, and in other aspects, data repository 144 may include any additional or alternate type of data that facilitates a performance of operations consistent with the disclosed embodiments by transaction system 140, either alone or in conjunction with ATM 170 and/or other third-party computing systems (not depicted in FIG. 1).

ATM 170 may, in certain aspects, represent a computing system configured to execute software instructions (e.g., one or more executable application modules) that perform operations consistent with disclosed embodiments. For example, and as described below, parties to a particular P2P transaction may meet at ATM 170 at a scheduled date and time (e.g., as established by transaction system 140), and may complete the P2P transaction in a safe, secure, and trusted environment. In one instance, the parties to the P2P transaction (e.g., users 101 and 121) may provide input to ATM 170 that specifies each of the unique session identifiers (e.g., as assigned to users 101 and 121 by transaction system 140), and based on the received session identifiers, ATM 170 may access data associated with the scheduled transaction session, and perform operations that monitor and document (e.g., using a digital camera or microphone) interactions between the parties during completion of the P2P transaction.

The disclosed embodiments are, however, not limited to processes that schedule a transaction session between the parties to the P2P transaction, and in other aspects, the transaction session may be unscheduled, and one or more of the parties to the P2P transaction may initiate the unscheduled transaction session by providing to ATM 170 input data that specifies the unique session identifiers, As described below, the unique session identifiers may be linked to data associated with the unscheduled transaction, e.g., transaction data 174B, and in response to the received input, ATM 170 may access data associated with the unscheduled P2P transaction, initiate the unscheduled P2P transaction between the parties, and perform operations that monitor and document the interactions between the parties during completion of the P2P transaction.

Further, and upon completion of the P2P transaction, each of the parties may input a corresponding personal identification number (e.g., a PIN assigned by a corresponding financial institution) to ATM 170. In some aspects, the entry of the PIN by each of the parties may indicate a mutually satisfactory completion of the P2P transaction, and in response to the entry of the PINs, ATM 170 may perform one or more operations consistent with the established parameters of the now-completed P2P transaction, which include, but are not limited to, disbursing of cash to one or more parties, initiating a funds transfer between accounts of various partiers, or initiating an e-transfer between accounts of various patties.

Referring back to FIG. 1, ATM 170 may include one or more servers (e.g., server 172) and tangible, non-transitory memory devices storing executable code and application modules. Further, server 172 may include one or more processor-based computing devices, which may be configured to execute portions of the stored code or application modules to perform operations consistent with the disclosed embodiments, including operations consistent with the exemplary processes described herein. In other instances, and consistent with the disclosed embodiments, transaction system 140 may correspond to a distributed system that may include computing components distributed across one or more networks, such as network 165, or other networks, such as those provided or maintained by cloud-service providers. ATM 170 may also include a hardware-based communications module, such as a wireless transceiver capable to receiving and transmitting data across one or more communications networks, such as network 165.

ATM 170 may maintain a data repository 174 (e.g., within one or more of the tangible, non-transitory memories) that includes, among other things, session data 174A and parameter data 174B. In some aspects, session data 174A may include structured data records that identify one or more transaction sessions scheduled by transaction system 140, individual parties to the scheduled transaction times, and dates and times reserved for these scheduled transaction sessions. In other aspects, the one or more transaction sessions may be unscheduled and initiated on-the-fly by the corresponding parties (e.g., users 101 and 121) at a mutually agreeable time, date, and/or location by providing input specifying the unique session identifiers to a corresponding ATM, such as ATM 170. ATM 170 may, for example, access data associated with the unscheduled transaction, such as transaction data 174B, and perform operations that initiate, document, and monitor the P2P transaction, as described below.

Further, in certain aspects, parameter data 1746 may include structured data records that identify one or more transaction parameters associated with the scheduled or unscheduled transaction sessions, which may be linked to and associated with corresponding unique transaction identifiers and obtained from transaction system 140 in response to an entry of corresponding session identifiers. The disclosed embodiments are, however, not limited to these examples of stored data, and in other aspects, data repository 174 may include any additional or alternate type of data that facilitates a performance of operations consistent with the disclosed embodiments by ATM 170, either alone or in conjunction with transaction system 140 and/or other third-party computing systems (not depicted in FIG. 1).

Referring back to FIG. 1, ATM 170 may also include a display unit 176A that displays information to users 101 or 121 (e.g., a liquid-crystal display (LCD) unit) and an input unit 176B that to allow users 101 or 121 to input information to ATM 170 (e.g., a keypad, keyboard, capacitive overlays, voice-activated control technologies, or any other type of known input device). In one aspect, display unit 176A and input unit 1766 may be incorporated into a integrated interface unit that displays the information to users 101 or 121 and also allows users 101 or 121 to input information to ATM 170. For example, display unit 176A may correspond to a LCD unit, and input device 176B may correspond to a capacitive overlay disposed on a surface of the LCD unit (e.g., onto a corresponding LCD screen) to form the integrated interface unit (e.g., a pressure-sensitive, touchscreen interface unit). In other aspects, and consistent with the disclosed embodiments, input unit 176B may include a keypad, keyboard, mouse, microphone, or other input device appropriate to ATM 170, and display unit 176A may be separate and distinct from input unit 176B. Additionally, in some aspects, each of display unit 176A and input unit 176B may be coupled to server 172 and configured in accordance with code and/or application modules executed by server 172.

ATM 170 may also include an audio-video (AV) interface 178 and various components 179, each of which may be coupled to server 172 and configured in accordance with code and/or application modules executed by server 172. AV interface 178 may include, but is not limited to, digital camera and a microphone, and may be configured to digital video, image, and/or audio of an environment in which ATM 170 operates during completion of a scheduled transaction session. In some aspects, by capturing digital video, image, and/or audio data, ATM 170 may facilitate a safe, secure, and trusted environment for completing trustless transactions between potentially unknown parties, e.g., the scheduled P2P transaction between users 101 and 121 described above. Further, components 179 may include, but are not limited, one or more electro-mechanical devices or components configured to disburse cash to one or more users, electro-magnetic card stripe readers, EMV card chip readers, and/or components that accept and process physical deposits of cash, check, or other paper instruments.

Network 265 may include one or more communication networks or mediums of digital data communication. Examples of communication network 165 include a local area network (LAN), a wireless LAN (e.g., a "WiFi" network), a RF network, a Near Field Communication (NFC) network, a wireless Metropolitan Area Network (MAN) connecting multiple wireless LANs, NFC communication link(s), and a wide area network (WAN), e.g., the Internet. Consistent with embodiments of the present disclosure, communications network 120 may include the Internet and any publicly accessible network or networks interconnected via one or more communication protocols, including, but not limited to, hypertext transfer protocol (HTTP) and transmission control protocol/internet protocol (TCP/IP). Communications protocols consistent with the disclosed embodiments also include protocols facilitating data transfer using radio frequency identification (RFID) communications and/or NFC. Moreover, network 165 may also include one or more mobile device networks, such as a GSM network or a PCS network, allowing devices 102 and 122 to send and receive data via applicable communications protocols, including those described herein.

Although computing environment 100 is illustrated in FIG. 1 with transaction system 140 in communication with devices 102 and 122 and ATM 170 across network 165, persons of ordinary skill in the art will recognize that environment 100 may include any additional number of devices, any additional number of ATM machines, and any additional number of computers, systems, or servers without departing from the spirit or scope of the disclosed embodiments. Further, although described in terms of a single communications network, e.g., network 165, the disclosed embodiments are not limited to this network configuration, and in additional embodiments, any additional or alternate number of communications networks may interconnect the components of computing environment 100.

II. Exemplary Computer-Implemented Processes for Automatically Performing Parameter-Based Operations within Trusted Networking Environments In certain embodiments, one or more individuals may elect to participate in a transaction, e.g., a person-to-person (P2P) transaction, in which a first one of the individuals, e.g., user 101, agrees to sell or trade one or more goods or services to a second one of the individuals, e.g., user 121, in exchange for financial consideration or payment. For example, user 101 (e.g., a seller) may possess tickets to a sporting event, such as an upcoming pre-season hockey game, and may advertise the tickets for sale within one or more social networking platforms, web-based classifieds, and/or web-based marketplaces or auctions. In some instances, user 121 (e.g., a buyer) may establish contact with user 101 and express interest in purchasing the tickets through one or more electronic communication channels (e.g., email, text-message, social-media messages, etc., transmitted generated by and transmitted from device 122) or through face-to-face interaction with user 101.

Further, and through the established electronic or face-to-face contact, the seller, e.g., user 101, and the buyer, e.g., user 121, may agree on certain parameters of the purchase transactions, which include, but are not limited to, a delivery date and location for the tickets (e.g., Nov. 1, 2016), a purchase price (e.g., $150), and a payment mechanism for delivering funds to from the buyer to the seller in exchange for the tickets (e.g., a physical exchange of cash, and email- or text-message-based e-transfer, a deposit of funds by the buyer into an account of a seller held at a digital payment service, such as PayPal™). Users 101 and 121 may met at the agreed-upon delivery time and location, with an intention of exchanging the tickets for the agreed-upon funds delivered in accordance with the agreed-upon payment mechanism.

In some aspects, and as described above, the P2P transaction between users 101 and 121, in which user 101 provides the tickets to user 102 in exchange for $150, may represent a "trustless" transaction, at least because users 101 and 121 may be mutually unknown to each other, and because users 101 and 121 do not rely on a trusted, third-party computing system to monitor and enforce compliance with the agreed-upon transaction parameters, such as a computing system maintained by a financial institution, web-based marketplace or auction, or other third-party known to and trusted by the users 101 and 121. Instead, user 101 must rely on user 121, and similarly, user 121 must rely on user 101, to perform in accordance with the agreed-upon transaction parameters, e.g., that user 101 delivers the tickets to user 121 on November $1^{st}$, and that user 121 deliver $150 in exchange for the tickets.

For example, by participating in the P2P transaction, user 121 may rely on user 101's possession of, or ability to access and obtain, valid tickets to the sporting event prior to the November $1^{st}$ delivery date, and user 101 may rely on user 121's intention or ability to provide the agreed-upon $150 in funds in accordance with the agreed-upon delivery mechanism. Furthermore, to effect a physical delivery of the tickets to user 121, both users 101 and 121 may mutually rely on a lack of malicious intent when arriving at the agreed-upon delivery location and time. As described below in reference to FIGS. 2A-2D, the disclosed embodiments may enable the seller and the one or more buyers to rely on trusted, third-party computing network, such as an automated-teller machine (ATM) network, to enable the trustless, P2P transaction described above to occur in both a physically and financially secure manner.

For example, after establishing initial contact with user 121 using any of the processes described above, user 101 may access a web page or other graphical user interface (GUI) associated with transaction system 140 (e.g., a GUI generated by a mobile application provided by transaction system 140), which may be presented by device 102 through a corresponding input unit, such as a pressure-sensitive, touchscreen display or a capacitive overlay on a LCD unit. In some aspects, and prior to accessing the presented web page or GUI, user 101 may provide input to device 102 that specifies one or more authentication credentials (e.g., a user name, an alphanumeric password, one or more biometric credentials, etc.) enabling device 102 and additionally or alternatively, transaction system 140, to authenticate an identity of user 101. In response to a successful authentication, device 102 may present the web page or GUI associated with transaction system 140 to user 101 through the corresponding input unit.

Figure 2A:
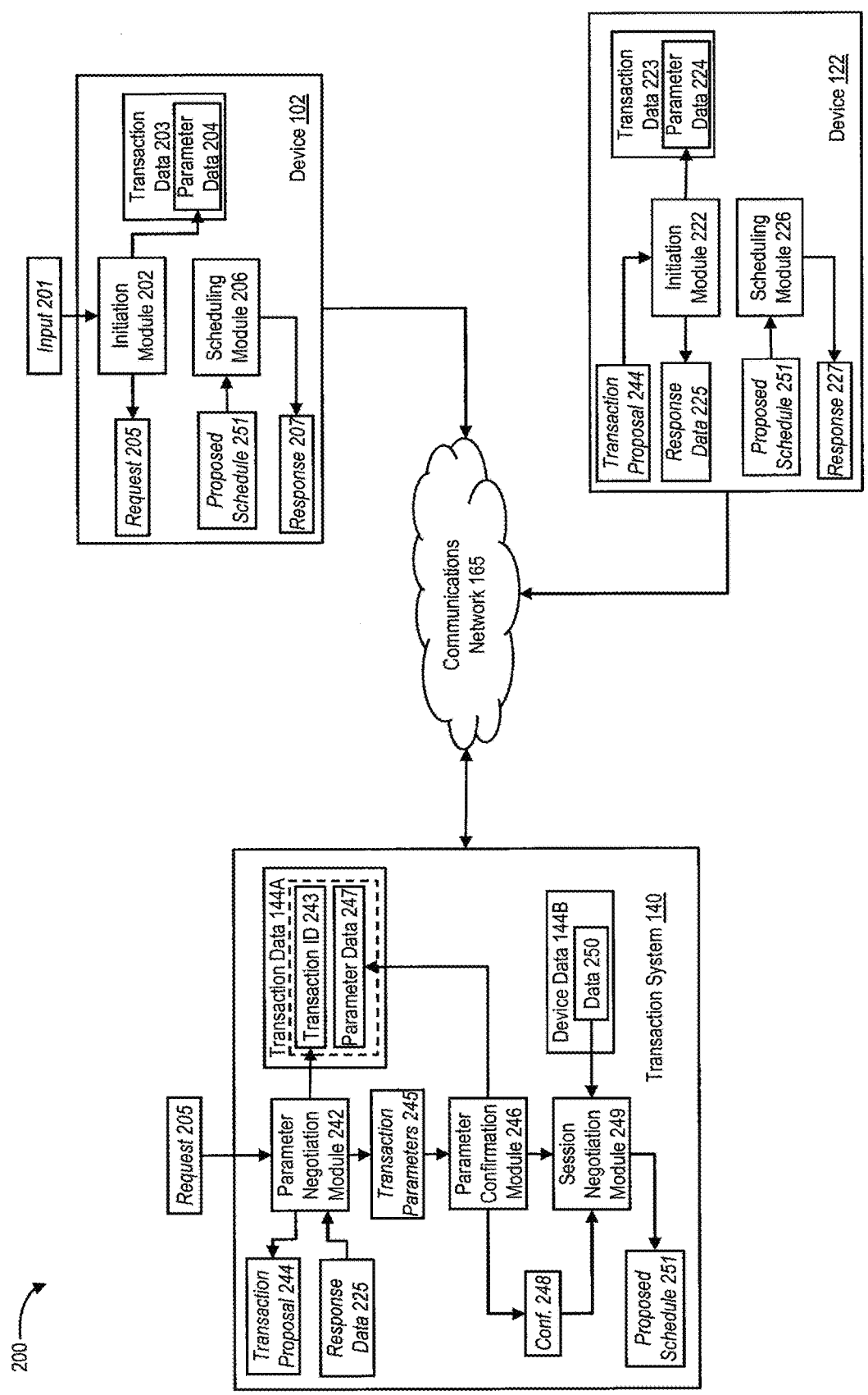
FIGS. 2A, 2B, 2C, and 2D are additional diagrams illustrating portions of an exemplary computing environment, consistent with the disclosed embodiments.

The presented web page or GUI may, in certain instances, prompt user 101 to provide input to device 102 that specifies one or more transaction parameters of the proposed P2P transaction involving user 121. For example, and as described above, user 121 may agree to purchase the tickets to the upcoming sporting event from user 101 from $150, which user 121 may agree to provide to user 101 in exchange for a delivery of the tickets in Nov. 1, 2016. Referring to FIG. 2A, user 101 may provide, to device 102 through the input unit, input (e.g., input 201) that identifies the buyer of the tickets (e.g., user 121's name and contact information, such as an email address, telephone number, social-networking handle, etc.) and one or more proposed parameters of the P2P transaction, such as the purchase price of the tickets (e.g., $150), the delivery date of the tickets (e.g., Nov. 1, 2016), and a proposed payment mechanism for delivering the funds corresponding to the purchase price (e.g., a disbursement of cash by ATM 170, an electronic transfer of funds to a specific account of user 101, an e-transfer of funds to user 101, etc.). Additionally or alternatively, input 201 may also include data specifying the specific account that user 101 intends to receive a potential electronic funds transfer, e.g., an account number and/or a routing number assigned to the specific account of by a corresponding financial institution.

In some aspects, device 102 may receive input 201, and an initiation module 202 of device 102 may perform operations that process input 201, extract data identifying the transaction parameters, and store the extracted data within one or more tangible, non-transitory memories, e.g., as parameter data 204 within transaction data 203. Initiation module 202 may also perform operations that package the extracted data into a request to establish a data exchange session (e.g., a transaction session) for the proposed P2P transaction (e.g., request 205), along with additional data that identifies users 101 and/or 121 (e.g., a user name and contact information, such as an email address, telephone number, social-networking handle, etc.) and that identifies device 102 (e.g., an IP address within network 165). Device 102 may transmit request 205 to transaction system 140 across network 165 using any of the exemplary communications protocols described above, including protocols that encrypt request 205 using any appropriate encryption scheme.

Transaction system 140 may receive request 205 from device 102, and a parameter negotiation module 242 of transaction system 140 may perform operations to establish one or more parameters for the proposed P2P transaction that are mutually agreeable to both users 101 and 121. For example, parameter negotiation module 242 may perform operations that extract, from request 205, data identifying the one or more transaction parameters specified by user 101, data identifying one or more counterparties to the proposed P2P transaction (e.g., user 121's name and contact information), and further, data identifying user 101 and/or device 102, as described above.

In some aspects, parameter negotiation module 242 may also perform operations that generate a transaction identifier 243 that uniquely identifies the proposed P2P transaction and the one or more parameters of that proposed transaction specified by user 101. For example, transaction identifier 243 may include an alpha-numeric character string having a predetermined length or composition, and parameter negotiation module 242 may generate transaction identifier 243 in accordance with any of a number of generation algorithms, which include, but are not limited to, random-number generation algorithms, pseudo-random-number generation algorithms that utilize portions of the data extracted from request 205, and/or various cryptographic algorithms, such those that compute a cryptographic hash representative of a portion of the transaction parameters proposed by user 101. As illustrated in FIG. 2A, parameter negotiation module 242 may perform operations that store transaction identifier 243 within one or more of the structured data records of transaction data 144A.

Additionally, in certain aspects, parameter negotiation module 242 may perform additional operations to generate a transaction proposal 244 that includes data identifying the proposed P2P transaction and the one or more transaction parameters proposed by user 101 for the P2P transaction (e.g., as extracted from request 205), along with additional data identifying user 101, such as a name and/or any of the exemplary contact information described above). For example, the proposed P2P transaction may enable user 121 to purchase tickets to the upcoming preseason hockey game offered for sale by user 101, and transaction proposal 244 may include data characterizing the proposed P2P transaction (e.g., the purchase of tickets by user 121), data identifying the parties to the proposed P2P transaction (e.g., users 101 and 102), and data specifying the one or more transaction parameters for the proposed P2P transaction, such as the proposed purchase price of $150, the proposed delivery date of November 1$^{st}$, and the proposed payment mechanism.

Transaction system 140 may, in some instances, transmit transaction proposal 244 across network 165 to device 122. For example, transaction system may transmit transaction proposal 244 as an email message (e.g., directed to the email address of user 121 specified within request 205), as a text message (e.g., directed to the telephone number of user 121 specified within request 205), as a direct message within one or more social-networking platforms (e.g., directed to the social-networking handle of user 121 specified within request 205), and additionally or alternatively, using any other channel of electronic communication accessible to user 121 through device 122.

Device 122 may receive transaction proposal 244, and an initiation module 222 of device 122 may perform operations that extract, from transaction proposal 244, portions of the data characterizing the proposed P2P transaction (e.g., the purchase of user 101's tickets by user 121), the data identifying the parties to the proposed P2P transaction (e.g., users 101 and 102), and the data specifying the one or more transaction parameters for the proposed P2P transaction, such as the proposed purchase price of $150, the proposed delivery date of November 1$^{st}$, and the proposed payment mechanism. In certain aspects, initiation module 222 may perform additional operations that present portions of the extracted data to user 121 through a corresponding display unit, such as the LCD screen of the pressure-sensitive, touchscreen interface unit. Further, and in response to the presented data portions, device 122 may receive, via the input unit, input from user 121 that evinces an agreement to complete the proposed P2P transaction in accordance with the one or more transaction parameters specified by user 101, and additionally or alternatively, that identifies specific points of disagreement with the one or more transaction parameters specified by user 101 and specifies a counter-proposal reflecting one or more of the specific points of disagreement.

In one aspect, initiation module 222 may perform operations that present the portions of the extracted data (such as the data characterizing the P2P transaction, the data identifying users 101 and 121, and/or the data identifying the one or more transaction parameters specified by user 101) within a web page or other graphical user interface (GUI) displayed by a corresponding display unit. For example, the web page may be associated with transaction server 140 (and additionally or alternatively, a financial institution that maintains transaction server 140), and the GUI may be generated by a mobile application executed by device 122 (e.g., a mobile application provided by transaction system 140 or the financial institution). In some instances, user 121 may be a registered, prior user of transaction system 140, and prior to accessing the web page or GUI, user 121 may provide input to device 122 that specifies one or more authentication credentials (e.g., a user name, an alphanumeric password, one or more biometric credentials, etc.) that enable device 122 and additionally or alternatively, transaction system 140, to authenticate and identity of user 121. In response to a successful authentication, device 122 may present the web page or GUI associated with transaction system 140 to user 121 through the corresponding display unit.

Alternatively, user 121 may not be a registered, prior user of transaction system 140. For example, the proposed P2P transaction may represent a first transaction transaction involving user 121, and user 121 may not possess authentication credentials sufficient to access transaction system 140. In some aspects, and prior to presenting the web page or GUI to user 121 through the corresponding display unit, user 121 may provide input to device 122 (not depicted in FIG. 2A) that, when transmitted to transaction system 140 across network 165, causes transaction system 140 to perform operations that register user 121 onto transaction system 140. For example, the provided input may specify a candidate username and password, and transaction system 140 may verify that the candidate username uniquely identifiers user 121 (e.g., and not any other registered user of transaction system 140) and that the candidate password complies with one or more established rules (e.g., minimum lengths and composition). In response to a successful verification of the candidate username and password, transaction system 140 may assign the candidate username and password to user 121, register user 121 onto transaction system 140, and transmit a confirmation of the assignment and registration to device 122 across network 165.

In response to a successful authentication (and additionally or alternatively, a successful registration onto transaction system 140), device 122 may present the extracted data portions through the web page or other GUI displayed by the corresponding display unit. For example, and as described above, the web page or other GUI may present information that characterizes the proposed P2P transaction between users 101 and 121 (e.g., the purchase of user 101's tickets by user 121), the identifies and provides contact information for user 101, and further that identifies the one or more transaction parameters specified by user 101, such as the proposed purchase price of $150, the proposed delivery date of November 1$^{st}$, and the proposed payment mechanism. Further, and as described above, the web page or other GUI may also present information prompting user 121 to provide, to device 122, input indicative of an agreement to complete the proposed P2P transaction in accordance with the one or more transaction parameters specified by user 101, and additionally or alternatively, input identifying and characterizing specific points of disagreement with the one or more transaction parameters.

In one embodiment, user 121 may provide, via the corresponding input unit, input indicative of the agreement to complete the proposed P2P transaction in accordance with the proposed purchase price of $150, the proposed delivery date of November 1$^{st}$, and the proposed payment mechanism. Further, the provided input may also specify the source account intended by user 121 to fund the purchase of the tickets (e.g., an account number and/or routing number of a checking account capable of funding the $150 purchase price of the tickets). Initiation module 222 may receive the provided input, and may generate a response data, e.g., response data 225, that indicates user 121's agreement to complete the proposed P2P transaction in accordance with the proposed transaction parameters and identifies the source account intended by user 121 to fund the proposed P2P transaction. Device 122 may transmit response data 225 across network 165 to transaction system 140 using any of the communications protocols described above.

Transaction system 140 may receive response data 225, and in certain aspects, parameter negotiation module 242 may parse response data 225 to detect the agreement of user 121 with the specified transaction parameters of the proposed P2P transaction. In response to the detected agreement, parameter negotiation module 242 may provide data identifying the transaction parameters specified by user 101 and the source account specified by user 121, e.g., as extracted from response data 225, as input to a parameter confirmation module 246 of transaction system 140.

Parameter confirmation module 246 may receive the provided data, e.g., transaction parameters 245, and may perform operations that establish a mutual agreement between users 101 and 121 regarding the transaction parameters for the proposed P2P transaction. For example, and as described above, the mutually agreeable transaction parameters may include, but are not limited to, the $150 purchase price, the delivery data of Nov. 1, 2016, and a payment mechanism that funds the $150 purchase from a checking account specified by user 121. In some aspects, parameter confirmation module 246 may store data indicative of the mutually agreeable transaction parameters within corresponding structured data records of transaction data 144A, e.g., within parameter data 247, and may associated parameter data 247 with transaction identifier 243, which uniquely identifies the proposed P2P transaction. Additionally, parameter confirmation module 246 may also generate a confirmation 248 of the established, mutually agreeable transaction terms and provide confirmation 248 as an input to session scheduling module 249 of transaction system 140, which as described below, may perform operations that schedule transaction session during which users 101 and 121 may conduct the proposed P2P transaction in a secure and trusted environment.

In other embodiments, user 121 may disagree with all, or a subset of, the transaction terms specified by user 101 for the proposed P2P transaction. For example, user 121 may still express an interest in purchasing the tickets, but only for a purchase price of $100. In certain aspects, user 121 may provide additional input to device 102 that identifies a particular transaction parameter associated with the disagreement, e.g., the purchase price, and additionally or alternatively, a counter-proposal related to that particular transaction parameter, e.g., a purchase price of $100 instead of $150. Device 122 may receive the additional provided input, and may generate portions of response data 225 that identifying the particular points of disagreement with the transaction terms specified by user 101 and further, one or more counter-proposals specified by user 121. Device 122 may transmit response data 225 across network 165 to transaction system 140, and transaction system 140 may, in some aspects, relay portions of response data 225 back to device 102.

In some aspects, device 102 may perform any of the exemplary processes described above to present, through the corresponding display unit, information highlighting the points of disagreement identified by user 121 and/or the one or more specified counter-proposals. Device 102 may receive further input provided by user 101 that indicates an acceptance of the one or more counter-proposals specified by user 121, or alternatively, that identifies additional points of disagreement and/or additional counter-proposals. Device 102 may transmit data that includes this further input to transaction system 140, which may relay the data to device 122 as an additional transaction proposal using any of the exemplary processes described above. In certain instances, parameter negotiation module 242 of transaction system 140 may perform operations that repeatedly exchange data indicative of transaction proposals and counter-proposals between devices 102 and 122, which may facilitate an iterative negotiation process across any of the channels of electronic communication outlined above.

Referring back to FIG. 2A, and in response to the established, mutually agreeable transaction parameters, session negotiation module 249 may perform operations that schedule a transaction session during which users 101 and 121 may conduct the proposed P2P transaction in a secure and trusted environment. For example, session negotiation module 249 may access device data 144B, and obtain stored data records, e.g., data 250, that specifies locations and availabilities of one or more ATMs available to host transaction sessions on the agreed-upon delivery date of the tickets, e.g., Nov. 1, 2016. For example, data 250 may identify ATM 170 and its physical location (e.g., 66 Wellington Street West), and may indicate that ATM 170 is available on Nov. 1, 2016, to host the P2P transaction between users 101 and 121 at 10:00 a.m., 12:30 p.m., and 3:45 p.m. Session negotiation module 249 may, in some instances, perform operations that generate proposed schedule data 251, which may identify the ATM available on November $1^{st}$ (e.g., ATM 170) and those times ATM 170 is available to host a transaction session on November $1^{st}$ (e.g., 10:00 a.m., 12:30 p.m., and 3:45 p.m.), and transaction system 140 may transmit proposed schedule data 251 across network 165 to devices 102 and 122.

In some aspects, each of devices 102 and 122 may proposed schedule data 251, and may present, through the corresponding display units, portions of proposed schedule data 251 to corresponding ones of users 101 and 121 using any of the exemplary processes described above. For example, devices 102 and 122 may present, within a web page or other GUI displayed by the corresponding interfaces, information that identifies ATM 170, its street address (e.g., 66 Wellington Street West), and its availability to the transaction session at 10:00 a.m., 12:30 p.m., and 3:45 p.m. on Nov. 1, 2016. In response to the presented information, each of users 101 and 121 may provide, to corresponding ones of devices 102 and 122 through the corresponding input units, input specifying a selection of one or more of the available times for the transaction session on November $1^{st}$.

For example, user 101 may be available all day on November $1^{st}$, and may provide input to device 102 selecting each of the available times, e.g., 10:00 a.m., 12:30 p.m., and 3:45 p.m., for the transaction session on November $1^{st}$. In some aspects, device 102 may generate a response, e.g., response 207, to proposed schedule data 251 that identifies user 101's selection of the available time slots (e.g., 10:00 a.m., 12:30 p.m., and 3:45 p.m.) and includes additional data identifying user 101 and/or device 102, and may transmit response 207 across network 165 to transaction system 140.

In other instances, user 121 may be scheduled to travel in the afternoon of November $1^{st}$, and may provide input to device 122 that selects the available 10:00 a.m. time for the transaction session on November $1^{st}$. As described above, device 122 may generate a response, e.g., response 227, to proposed schedule data 251 that identifies user 121's selection of the available 10:00 a.m. time slot and includes additional data identifying user 121 and/or device 122, and may transmit response 227 across network 165 to transaction system 140.

Figure 2B:
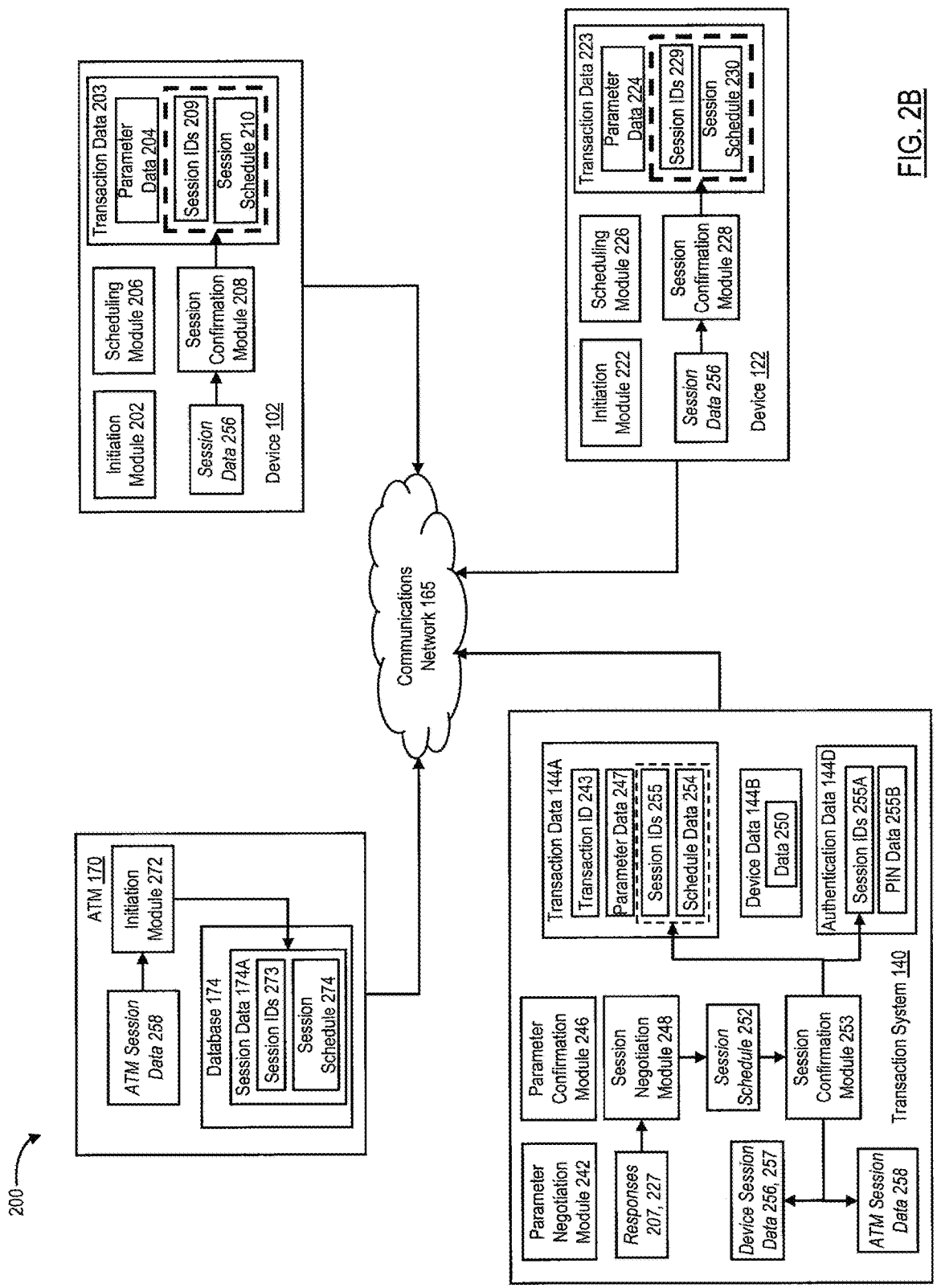

Referring to FIG. 2B, transaction system 140 may receive responses 207 and 227 (e.g., from devices 102 and 122), and session negotiation module 248 may perform operations that select a mutually agreeable time slot for a transaction session hosted at ATM 170 (and additionally or alternatively, at any other mutually agreeable ATM identified by session negotiation module 248 based on responses 207 and 227). For example, and based on responses 207 and 227, session negotiation module 248 may determine that users 101 and 121 are both available to conduct the proposed P2P transaction during a transaction session hosted by ATM 170 at 10:00 a.m. on Nov. 1, 2016. In some aspects, and in response to the determination, session negotiation module 248 may perform operations that generate session schedule data 252 identifying the mutually agreeable time for the transaction session, ATM 170 and its physical location, which session negotiation module 248 may provide as input to a session confirmation module 253 of transaction system 140.

Session confirmation module 253 may receive the provided data, e.g., session schedule data 252, and may perform operations that establish a mutual agreement between users 101 and 121 regarding a time, date, and location of the scheduled transaction session, e.g., 10:00 a.m. on Nov. 1, 2016, at the physical location of ATM 170. In some aspects, and based on the established mutual agreement, session confirmation module 253 may generate session identifiers that associate each of users 101 and 121 with the scheduled transaction session, the time, date, and location of that scheduled transaction session, and as described below, the mutually agreeable transaction parameters of the proposed P2P transaction session.

In one aspect, the generated session identifiers may be session- and user-specific, and session confirmation module 253 may generate and assign a corresponding session identifier to each of users 101 and 121 (and additionally or alternatively, to any other party to the proposed P2P transaction associated with the scheduled transaction session). In other aspects, and consistent with the disclosed embodiments, the generated session identifiers may be session-specific, and session confirmation module 253 may generate and assign a single, common session identifier to each of users 101 and 121, and to any other parties to the P2P transaction. Additionally, the session- and/or user-specific session identifiers may each include an alpha-numeric character string having a predetermined length or composition, and session confirmation module 253 may generate the session identifiers in accordance with any of a number of generation algorithms, which include, but are not limited to, random-number generation algorithms, pseudo-random-number generation algorithms that utilize portions of the data extracted from responses 207 and 227, and/or various cryptographic algorithms, such those that compute a cryptographic hash representative of a portion of responses 207 and 227.

Additionally, and as illustrated in FIG. 2B, session confirmation module 253 may perform operations that store, within transaction data 144A, data that identifies the time, date, and location of the scheduled transaction session (e.g., as schedule data 254) and data that identifies the session identifiers generated for and assigned to users 101 and 121 (e.g., as session IDs 255). In some instances, session confirmation module 253 may perform additional operations that link the structured data records corresponding to session IDs 255 to those of schedule data 254, and further, to those of transaction identifier 243 and parameter data 247. By linking the session identifiers to the transaction identifier, the mutually agreeable transaction parameters, and the mutually agreeable time, date, and location of the scheduled transaction session, each of the session identifiers assigned to users 101 and 121 may be uniquely linked to and associated with the corresponding scheduled transaction session.

Further, session confirmation module 253 may perform operations that store additional data identifying the session identifiers generated for and assigned to users 101 and 121 within structured data records of authentication data 144D (e.g., as session IDs 255A), and may link the session identifier assigned to each of users 101 and 121 with a corresponding personal identification number (PIN) stored within PIN data 255B. As described above, a financial institution may assign the corresponding PIN to each of users 101 and 121, and by linking together the session identifier and the PIN assigned to each of users 101 and 121, the disclosed embodiments may establish an additional layer of security to ensure that the proposed P2P transaction is conducted by the appropriate parties during the scheduled transaction session.

Referring back to FIG. 2B, session confirmation module 253 may perform operations generating user-specific session data packages that confirm the time, date, and location of the scheduled transaction session and further, identify the session identifier assigned to the corresponding user. For example, session confirmation module 253 may perform operations to generate first session data 256, which includes scheduling data identifying the time, date, and location of the scheduled transaction session (e.g., 10:00 a.m. on Nov. 1, 2016, at ATM 170) and the session identifier assigned to user 101, and second session data 257, which includes the scheduling data and the session identifier assigned to user 121. Transaction system 140 may, in some instances, transmit first session data 256 to device 102, and transmit second session data 257 to device 122, using any of the processes described above.

Device 102 may receive first session data 256, and a session confirmation module 208 of device 102 may extract, from first session data 256, data identifying the time, date, and location of the scheduled transaction session (e.g., 10:00 a.m. on Nov. 1, 2016, at ATM 170) and data identifying the session identifier assigned to user 101, which may be stored within one or more tangible, non-transitory memories, e.g., as session ID 209 and session schedule 210 within transaction data 203. Similarly, device 122 may receive second session data 257, and a session confirmation module 228 of device 122 may extract, from second session data 257, data identifying the time, date, and location of the scheduled transaction session and data identifying the session identifier assigned to user 121, which may be stored within one or more tangible, non-transitory memories, e.g., as session ID 229 and session schedule 230 within transaction data 223.

Further, in certain aspects, session confirmation module 253 may perform operations that generate, and transmit to ATM 170, additional session data confirming the time, date, and location of the scheduled transaction session (e.g., 10:00 a.m. on Nov. 1, 2016, at ATM 170) and further, the session identifiers assigned to each party to the corresponding transaction session, e.g., user 101 and 121. Transaction system 140 may transmit the additional session data, e.g., ATM session data 258, to ATM 170 across network 165. ATM 170 may receive ATM session data 258, and in some aspects, a session initiation module 272 of ATM 270 may extract, from ATM session data 258, scheduling data that confirms the time, date, and location of the scheduled transaction session and the session identifiers assigned to users 101 and 121. Session initiation module 272 may perform operations that store the extracted scheduling data and session identifiers within one or more structured data records of data repository 174 (e.g., as session IDs 273 and session schedule 274 of session data 174A), and reserve ATM 170 for the scheduled transaction session at 10:00 a.m. on November $1^{st}$, at which time users 101 and 121 may conduct the proposed P2P transaction in a secure, trusted networking and physical environment.

In some aspects, device 102 and 122 may present, through the corresponding display units, information identifying the time, date, and location of the scheduled transaction session and additionally or alternatively, a corresponding one of the session- and/or user-specific session identifiers generated by transaction system 140. For example, the presented information may indicate that the transaction session to complete the proposed P2P transaction is currently scheduled for 10:00 a.m. on Nov. 1, 2016, at ATM 170, which may be located at 66 Wellington Street, West, in Toronto, Ontario, Canada. Based on the presented information, users 101 and 121 may proceed to the physical location of ATM 170, and may arrive at ATM 170 prior to the 10:00 a.m. starting time of the scheduled transaction session.

Initiation module 172 of ATM 170 may, in certain instances, access portions of data repository 174 that identify the start time and date of the scheduled transaction session (e.g., session schedule 274 of FIG. 2B), and at the start time, e.g., 10:00 a.m. on Nov. 1, 2016. For example, initiation module 172 may perform operations that generate and present, through display unit 176A, a graphical user interface (GUI) that prompts users 101 and/or 121 to provide input identifying corresponding ones of the assigned session identifiers. In certain aspects, and to initiate the scheduled transaction session, users 101 and/or 121 may provide, to input unit 176B, input that specifies corresponding ones of the session identifiers assigned by transaction system 140 (e.g., as provided to devices 102 and 122 within corresponding ones of first and second session data 256 and 257, as described above).

Figure 2C:
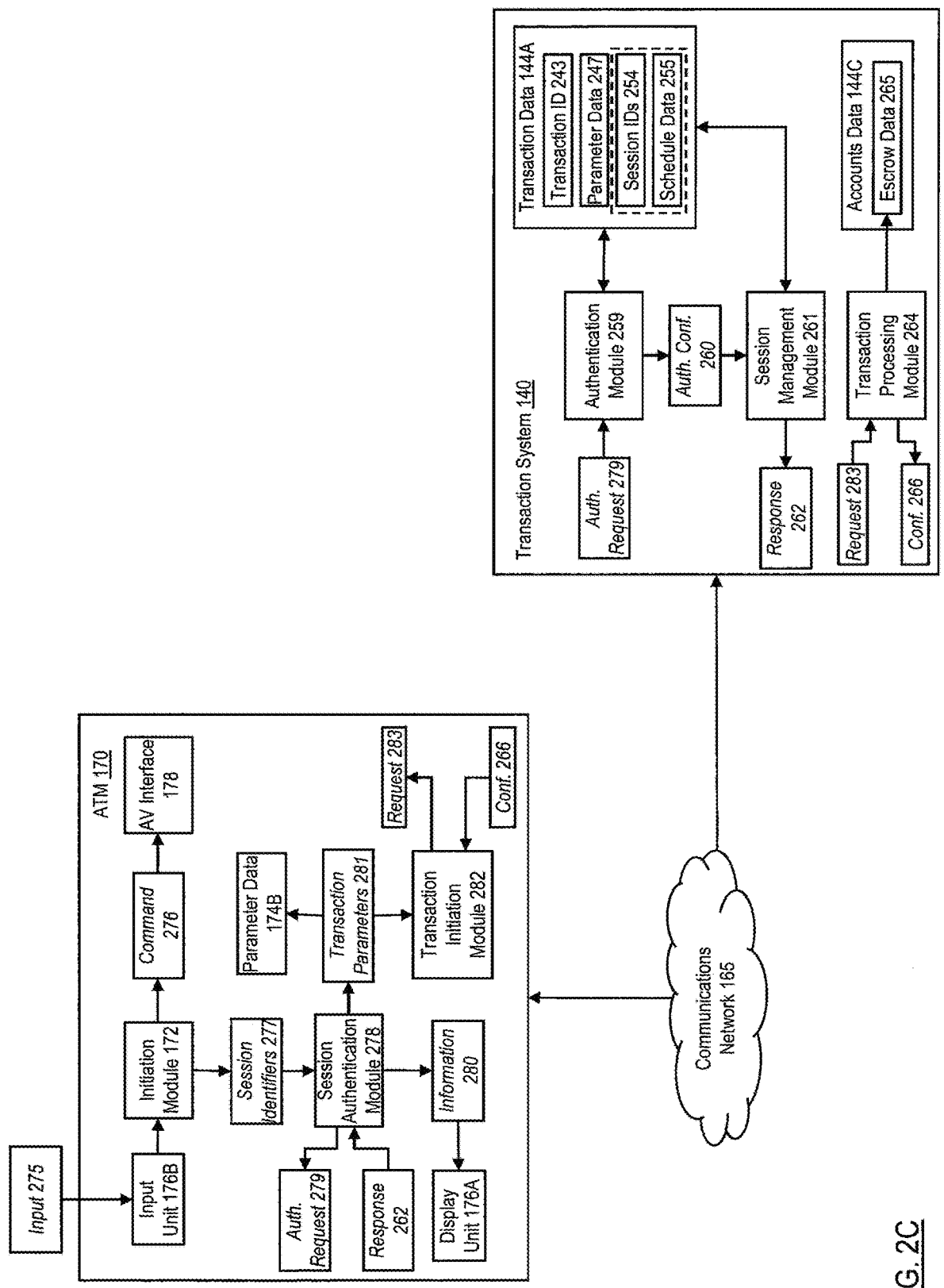

Referring to FIG. 2C, ATM 170 may receive the provided input, e.g., input 275, through input unit 176B, and in response to input 275, session initiation module 272 may perform operations to initiate the scheduled transaction session involving users 101 and 121. For example, session initiation module 272 may receive input 275, and may perform operations that detect a presence of the assigned session identifiers within input 275, further, and extract data indicative of the assigned session identifiers. In some instances, and in response to the detected session identifiers, session initiation module 272 may perform additional operations to generate one or more commands (e.g., command data 276) that, when provided to AV interface 178, activate and cause AV interface 178 to capture digital video, image, and/or audio data indicative of an interaction of users 101 and 121 while completing the proposed P2P transaction during the scheduled transaction session. By capturing digital video, image, and/or audio data during the scheduled transaction session, the disclosed embodiments may provide, via ATM 170, a safe, secure, and trusted environment for completing trustless transactions between potentially unknown parties, such as users 101 and 121.

Additionally, as illustrated in FIG. 2C, session initiation module 272 may provide data identifying the session identifies of users 101 and/or 121, e.g., session identifiers 277, as input to an authentication module 278 of ATM 170, which may perform operations that authenticate the provided session identifiers and confirm an association between these provided session identifiers and the transaction session scheduled for 10:00 a.m. on Nov. 1, 2016. For example, session authentication module 278 may perform operations that generate a session authentication request, e.g., request 279, that includes the session identifiers provided by users 101 and/or 121, time stamps at which ATM 170 received each of the session identifiers, and additionally or alternatively, data identifying users 101 and/or 121. In some aspects, ATM 170 may transmit request 279 across network 165 to transaction system 140 using any of the exemplary processes described above.

Transaction system 140 may receive request 279, and in some aspects, an authentication module 259 of transaction system 140 may perform operations that parse request 279 and extract, from request 279, data identifying the session identifiers of users 101 and/or 121 and the corresponding time stamps at which ATM 170 received each of the session identifiers. For example, authentication module 259 may extract a first session identifier assigned to user 101 and a second session identifier assigned to user 101 from request 279. Further, and based on request 279, authentication module 259 may establish that ATM 170 received the first session identifier from user 101 at 10:03 a.m. and received the second session identifier from user 121 at 10:01 a.m.

In certain aspects, authentication module 259 may perform operations that query the first and second transaction identifiers against the structured data records of transaction data 144A to determine whether the first and second session identifiers (e.g., as provided to ATM 170) corresponding to valid session identifiers assigned to parties associated with a scheduled transaction session. For example, and based on accessed portions of transaction data 144A, authentication module 259 may determine that the first and second session identifiers represent valid session identifiers assigned to users 101 and 121 (e.g. based on stored session identifiers 255), and further, that the first and session identifiers are linked to a corresponding transaction identifier (e.g., transaction identifier 243) and a transaction session scheduled for 10:00 a.m. on Nov. 1, 2016, at the physical location of ATM 170 (e.g., based on stored schedule data 254).

Additionally, and in response to the determination the first and second session identifiers represent valid session identifiers assigned to parties associated with a scheduled transaction session, authentication module 259 may perform additional operation to determine whether the time stamps associated with the first and second session identifiers fall within a threshold time period of the start time of the scheduled transaction session. In certain instances, the predetermined threshold time period may be established by a financial institution or other third-party that maintains transaction system 140 and/or ATM 170, and may correspond to a five-minute period, a ten-minute period, or any additional or alternate predetermined or adaptively determined time period appropriate to transaction system 140 and ATM 170.

In one aspect, if authentication module 259 were to determine that the time stamps associated with the first or second session identifiers fall outside the threshold time period of the start time, transaction system 140 may decline to authenticate the first and second session identifiers (and thus, the transaction session), and authentication module 259 may perform operations that generate and transmit an error message to ATM 170 (e.g., across network 165). In some aspects (not depicted in FIG. 2C), ATM 170 may present portions of the error message to users 101 and 121 through the display unit 176A. By declining to authentication transaction sessions associated with delayed (or premature) sessions identifiers, the disclosed embodiments may reduce a potential for fraud by third parties that may obtain unauthorized access to a session identifier assigned to one or more parties to a particular transaction session.

Alternatively, if authentication module 259 were to determine that the time stamps associated with the first or second session identifiers fall within the predetermined threshold time, transaction system 140 may authenticate the first and second session identifiers (and thus, the transaction session), and authentication module 259 may perform operations that generate an authentication confirmation 260, which may be provided as an input to a session management module 261 of transaction system 140. In certain aspects, and in response to authentication confirmation 260, session management module 261 may access the structured data records of transaction data 144A and perform operations that obtain data, e.g., parameter data 247, identifying the one or more mutually agreeable transaction parameters associated with the scheduled transaction session. Further, session management module 261 may perform additional operations that generate a response to session authentication request 279, e.g., response 262, that includes portions of authentication confirmation 260 and the data identifying the one or more mutually agreeable transaction parameters associated with the scheduled transaction session.

For example, the predetermined threshold time may correspond to a five-minute time period, and authentication module 259 may determine that ATM 170 received the first and second session identifiers from corresponding ones of users 101 and 121 within the five-minute time period of the 10:00 a.m. start time of the scheduled transaction session (e.g., at 10:03 a.m. and 10:01 a.m., respectively), and may generate and provide authentication confirmation 260 as an input to session management module 261. Further, and as described above, session management module 261 may obtain, from parameter data 247 of transaction data 144A, data identifying the one or more mutually agreeable transaction parameters of the proposed P2P transaction, such as the purchase price of $150, the delivery date of November $1^{st}$, and the proposed funding source for the purchase price (e.g., an account number and/or routing number of an account of user 121), which may be incorporated into response 262 along with portions of authentication confirmation 260.

Transaction system 140 may transmit response 262 across network 165 to ATM 170, and upon receipt by ATM 170, session authentication module 278 may perform operations that parse response 262 to obtain data indicative of the successful authentication (e.g., authentication confirmation 260) and the mutually agreeable transaction parameters of the proposed P2P transaction (e.g., parameter data 247), and ATM 170 may present information 280 indicative of the successful authentication and the mutually agreed-upon transaction parameters to user 101 and 121 through display unit 176A. Additionally, in some instances, the presented information that prompts users 101 and 121 to conduct the proposed P2P transaction in accordance with the mutually agreeable transaction parameter, and upon completion of the proposed P2P transaction (e.g., a transfer of the tickets from user 101 to user 121), to input corresponding personal identification numbers (PINs) associated with ATM 170, as described below.

Further, and prior to the completion of the proposed P2P transaction, session authentication module 278 may provide data indicative of the mutually agreed-upon transaction parameters, e.g., transaction parameters 281, as input to a transaction initiation module 282 of ATM 170 and further, may perform operations that store portions of transaction parameters 281 within a parameter data 1746 of data repository 174. In some aspects, transaction initiation module 282 may perform operations that, in conjunction with transaction system 140, identify a payment (or other financial consideration) associated with the P2P transaction, identify a source account selected to fund the payment, and further, place a portion of the funds within the source account in escrow, or alternatively, on hold on certain funds available within the source account, until a completion of the proposed P2P transaction signals a transfer of those escrowed or held funds from the source account.

For example, and as described above, the P2P transaction conducted during the initiated transaction session may represent a purchase by user 121 of tickets to the upcoming preseason hockey game from user 101. Based on transaction parameters 281, transaction initiation module 282 may, in some instances, perform operations that identify the $150 purchase price for the tickets and determine that user 121 specified a checking account held at a corresponding financial institution as a source account to fund the $150 purchase. Transaction initiation module 282 may perform additional operation that generate a transaction initiation request 283 identifying the specified source account and requesting that at least $150 within that specified source account be placed in escrow (or be held) until a completion of the P2P transaction between users 101 and 121, and ATM 170 may transmit transaction initiation request 283 across network 165 to transaction system 140.

Transaction system 140 may receive transaction initiation request 283, and a transaction processing module 264 of transaction system 140 may perform operations that extract, from transaction initiation request 283, data identifying the specified source account (e.g., the checking account of user 121 at the financial institution) and the requested transaction (e.g., the transfer of $150 within that specified source into escrow until a completion of the P2P transaction between users 101 and 121). In certain aspects, transaction processing module 264 may access the structured data records of data repository 144, and may perform operations that obtain data identifying one or more accounts held by user 121 at corresponding financial institutions (e.g., account data 144C), and based on the obtained data, confirm that the source account specified within transaction initiation request 283 (e.g., user 121's checking account) represents a valid and active financial services account of user 121 at the corresponding financial institution.

In response to the confirmation, transaction processing module 264 may perform additional operations that, either alone or in conjunction with one or more computing systems maintained by the corresponding financial institution (e.g., as accessible across network 165), transfer the specified sum of $150 from the source account (e.g., user 121's checking account) into a corresponding escrow account until a completion of the proposed P2P transaction and the transaction session. Additionally, transaction processing module 264 may perform further operations that store data confirming the disposition of the funds (e.g., the $150 purchase price) within the escrow account in a corresponding portions of accounts data 144C (e.g., in escrow data 265), and that generate a confirmation 266 of the escrowed funds, which transaction system 140 may transmit across network 165 to ATM 170. In certain aspects, ATM 170 may receive confirmation 266, and may await completion of the P2P transaction by users 101 and 121 and the provision of additional input specifying the corresponding PINs of users 101 and 121.

For example, while disposed proximate to the physical location of ATM 170, and while being monitored by AV interface 178, user 101 may provide physical copies of the tickets to user 121, who may inspect the tickets and confirm their authenticity (e.g., based on certain anti-counterfeiting features incorporated into the tickets, such as holographic inserts, embedded watermarks, etc.). Based on the inspection and confirmation, user 121 may express to user 101 a satisfaction with the exchanged tickets and a desire to complete the P2P transaction by in accordance with the mutually agreed-upon terms, e.g., by providing funds in the amount of $150. In certain aspects, rather than provide $150 in cash, or a negotiable instrument in the amount of $150, to user 101, users 101 and 121 may provide additional input to ATM 170 that confirms the mutual satisfaction of users 101 and 121 with the goods or services exchanged during the P2P transaction (e.g., the exchanged tickets) and further, requests completion of the P2P transaction in accordance with the mutually agreed-upon terms.

For example, ATM 170 may present, through display unit 176A, a graphical user interface (GUI) that prompts user 121 (e.g. the buyer in the P2P transaction) to confirm a satisfaction with goods or services received through the P2P transaction by providing input specifying a previously assigned personal identifier, such as a PIN that facilitates user 121's access to ATM 170. Similarly, and upon receiving the input of the PIN from user 121 through input unit 176B, ATM 170 may present an additional GUI that prompts user 101 to confirm a satisfaction with the exchange of goods or services during the P2P transaction by providing input specifying a previously assigned personal identifier, such as a PIN that facilitates user 101's access to ATM 170. The additional presented GUI may also display information identifying one or more payment mechanisms for receiving the agreed-upon payment, such as a dispensing of cash by ATM 170, an electronic funds transfer to a financial services account specified by user 101 (e.g., a checking account of user 101), an e-transfer of the agreed-upon payment via an e-mail address or telephone number specified by user 101, and any additional or alternate mechanism by which ATM 170 and transaction system 140 may collectively or individually compensate user 101 for the exchanged goods or services.

Figure 2D:
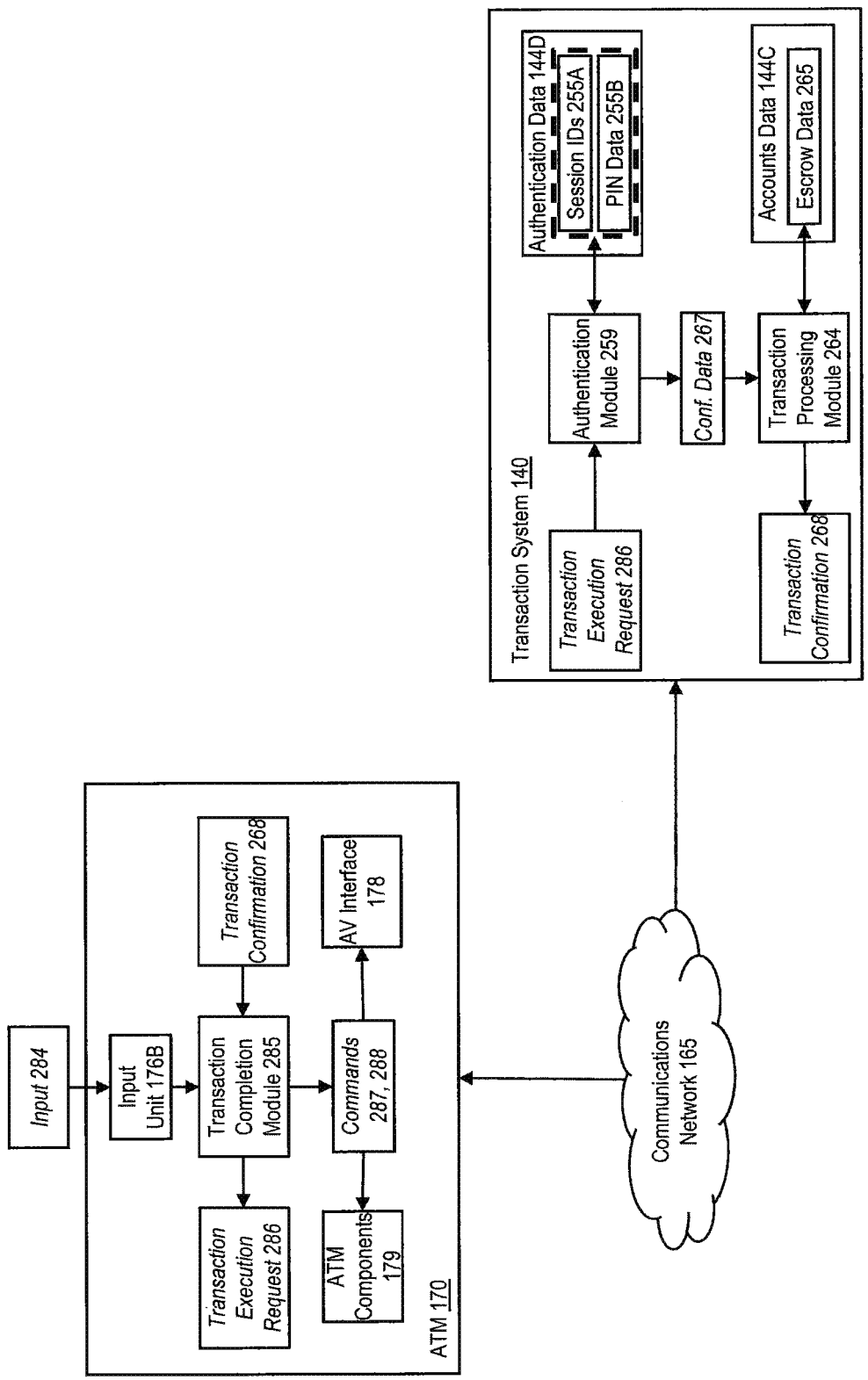

Referring to FIG. 2D, ATM 170 may receive input, e.g., input 284, that includes the PINs provided by users 101 and 121 and additionally or alternatively, a selection of the payment mechanism (e.g., the dispending of $150 cash by ATM 170 to reflect the agreed-upon payment for the exchanged tickets). In some aspects, a transaction completion module 285 of ATM 170 may extract, from input 284, data identifying the provided PINs of users 101 and 121, which may be incorporated into a transaction execution request 286 for transmission to transaction system 140. Additionally, and in certain aspects, transaction execution request 286 may also include data identifying the source account specified by user 121 to funds the agreed-upon payment, and further, the specified payment mechanism that provides the agreed-upon payment to user 101, e.g., as cash dispensed from ATM 170 or as funds transferred into one or more financial services accounts of the user.

For example, transaction completion module 285 may perform operations that extract data identifying the one or more payment mechanisms from input 285, as described above (e.g., the dispending of $150 cash by ATM 170 to reflect the agreed-upon payment). In other instances, transaction completion module 285 may access the structured data records of data repository 144 and extract, from parameter data 174B, data that identifies a corresponding payment mechanism specified by user 101 (e.g., an electronic funds transfer deposited into a checking account of user 101 held at a corresponding financial institution). Additionally, and in certain aspects, transaction completion module 285 may also obtain, from parameter data 174B, additional data that identifies the source account specified by user 121 to fund the agreed-upon payment (e.g., the account number and/or routing number assigned to user 121's checking account by a corresponding financial institution). Transaction completion module 285 may incorporate portions of the obtained or extracted data, along with the PINs of users 101 and 121, into transaction execution request 286, which ATM 170 may transmit to transaction system 140 across network 165.

Transaction system 140 may receive transaction execution request 286, and in some aspects, authentication module 259 may perform operations that parse transaction execution request 286 and extract, from transaction execution request 286, data identifying the PINs, the one or more specified payment mechanisms, and additionally or alternatively, the source account specified by user 121 to fund the agreed-upon payment. For example, authentication module 259 may extract a first PIN provided to ATM 170 by user 101, and a second PIN provided to ATM 170 by user 121, from transaction execution request 286. In certain aspects, authentication module 259 may perform operations that access the structured data records of authentication data 144D, and based on portions of stored PIN data 255B, determine that the first PIN corresponds to a PIN assigned to user 101 by a corresponding financial institution, and that the second PIN corresponding to a PIN assigned to user 121 by the corresponding financial institution (or by a different financial institution).

Additionally, and in response to the determination, authentication module 259 may perform additional operations that, based on stored session identifiers 255A, confirm the association between the first and second validated PINs of users 101 and 122 and corresponding ones of the session identifiers assigned to users 101 and 122 and representation of the scheduled transaction session (e.g., the transaction session scheduled for 10:00 a.m. on Nov. 1, 2016, at ATM 170). As described above, by linking together the session identifiers and the PIN assigned to each of users 101 and 121, the disclosed embodiments may establish an additional layer of security to ensure that the proposed P2P transaction is conducted by the appropriate parties prior to disbursing funds in accordance with the agreed-upon terms upon completion of the scheduled transaction session.

In response to the determined validity of the provided PINs, and the confirmed association with the assigned session identifiers, authentication module 259 may perform operations that generate confirmation data, e.g., data 267, indicative of the determined validity and the confirmed association, and further, may incorporate data identifying the corresponding payment mechanism and the specified source account within confirmation data 267. In some aspects, authentication module 259 may provide confirmation data 267 as an input to transaction processing module 264, which may perform operations that initiate and/or settle one or more transactions that withdraw funds consistent with the agreed-upon payment from the specified source account, and provide the withdrawn funds to user 101 in accordance with the identified payment mechanism.

For example, and based on confirmation data 267, transaction processing module 264 may perform operations that identify a distribution of cash by ATM 170 as the corresponding payment mechanism (e.g., as specified by user 101 when providing input to ATM 170 after exchanging the tickets with user 121). Additionally, transaction processing module 264 may also perform operations that determine, based on portions of stored escrow data 265 (e.g., as stored within the structured data records of account data 144C), that transaction system 140 previously transferred $150 in funds from the specified source account (e.g., the checking account specified by user 121) into the escrow account until completion of the P2P transaction. In certain aspects, transaction processing module 264 may perform operations, either alone or in conjunction with one or more computing systems maintained by a financial institution associated with the specified source account or the escrow account (not depicted in FIG. 2D), that liquidate the $150 held within the escrow account, update portions of stored account data 144C to reflect the liquidation of the escrowed funds, and further, generate instructions that, when processed by ATM 170, cause ATM 170 to dispense $150 in cash to user 101.

In some aspects, transaction processing module 264 may perform operations to generate a transaction confirmation, e.g., transaction confirmation 268, that confirms the completion of the P2P transaction and the provision of the agreed-upon payment in accordance with user 101's specific payment mechanism (e.g., the disbursement of cash by ATM 170) and includes the generated instructions causing ATM 170 to disburse the $150 in cash to user 101. Transaction system 140 may transmit transaction confirmation 268 across network 165 to ATM 170 using any of the communications protocols described above.

ATM 170 may receive transaction confirmation 268, and transaction completion module 286 may perform operations that display, within one or more GUIs presented through display unit 176A, information that confirms the conclusion of the P2P transaction between users 101 and 121 and identifies the payment mechanism through which user 101 receives the agreed-upon $150 payment (e.g., the disbursement of cash from ATM 170). Transaction completion module 285 may also perform operations that generate one or more electronic commands 287 instructing components of ATM 170 (e.g., components 179) to disburse $150 in cash, which reflects the agreed-upon payment to user 101 for the tickets sold to user 121. Further, and upon disbursement of the currency, transaction completion module 285 may generate one or more electronic commands 288 instructing AV interface 178 to cease the capture of digital video, image, and/or audio data indicative of the environment proximate to ATM 170, within which users 101 and 121 conducted the P2P transaction. Further, the cessation of operations by AV interface 178 may correspond to a completion of the scheduled transaction session between users 101 and 121, and initiation module 272 may perform any of the exemplary processes described above to detect an initiation of an additional transaction session involving one or more users of devices operating within environment 100.

In certain aspects, the disclosed embodiments may enable user 101 (e.g., a seller) and user 121 (e.g., a buyer) to rely on a trusted, third-party computing network, such as an automated-teller machine (ATM) network, to enable a trustless, P2P transaction to occur in both a physically and financially secure manner. For example, and using any of the exemplary processes described above, users 102 and 121 may provide input to an ATM, such as ATM 170, that uniquely identifies a scheduled or unscheduled P2P transaction, such as a sale of hockey tickets held by user 101 to user 121 in exchange for agreed-upon funds, and upon completion of the P2P transaction and delivery of the funds to user 101 in accordance with an agreed-upon delivery mechanism, user 101 may provide physical copies of the hockey ticket, such as paper tickets, to user 121.

The disclosed embodiments are, however, not limited to P2P transactions in which the user 101 provides physical copies of the tickets (e.g., paper tickets) to user 121 in exchange for the delivered funds. In additional aspects, the tickets may be provided to device 102 in digital form by a third-party computing system, such as a computing system maintained by the hockey organization or an online ticket marketplace (e.g., StubHub™). In anticipation of the P2P transaction with user 121, user 101 may access, through device 102, a web page or other digital portal (e.g., a graphical user interface generated by an executed mobile application) associated with the hockey organization or the online ticket marketplace, and provide input to device 102 that, when transmitted to the third-party computing system, causes the third party computing system to provide data associated with the digital tickets to transaction system 140 (e.g., to "transfer" the tickets to transaction system 140). Transaction system 140 may, for example, perform operations that associate the received digital ticket data with the unique session identifier, and store the digital ticket data in one or more tangible, non-transitory memories (e.g., in a portion of data repository 144 of FIG. 1).

In some instances, and using any of the processes described above, transaction system 140 may detect a delivery of the funds from user 121 to user 101 in accordance with the agreed-upon delivery mechanism and in response to the detected delivery, may transmit the digital ticket data to ATM 170, which may perform operations that print the hockey tickets for user 121. In other instances, transaction system 140 may perform operations that transmit the digital ticket data to device 122, which may present a graphical representation of the digital data within a corresponding graphical user interface, e.g., presented through a corresponding display unit. In other instances, ATM 170 may be configured to offer tickets (and other goods or services) for sale to users 101 or 121 in addition to, or as an alternate to, any of the processes described herein. As transaction system 140 may be configured to obtain a secure copy of the digital ticket data from a third-party computer system that issues the tickets, and may maintain that secure copy ion locally accessible memory while users 101 and 121 conduct the P2P transaction, to enable the trustless, P2P transaction to occur in a physically and financially secure manner that reduces a risk of fraud.

In certain embodiments, described above, an ATM network, and corresponding computer systems and devices operating within that ATM network (e.g., ATM 170) may perform operations that enable trustless, P2P transactions to occur in both a physically and financially secure manner. The disclosed embodiments are, however, not limited to these exemplary computer networks, devices, or systems, and in other aspects, a computer system or device in communication with any additional trusted, third-party computing network, such as devices 102 or 122 in communication with a secure network maintained by a financial institution, may be configured to perform any of the exemplary processes described above, either alone or in conjunction with transaction system 140, to enable trustless, P2P transactions to occur in both a physically and financially secure manner.

Figure 3:
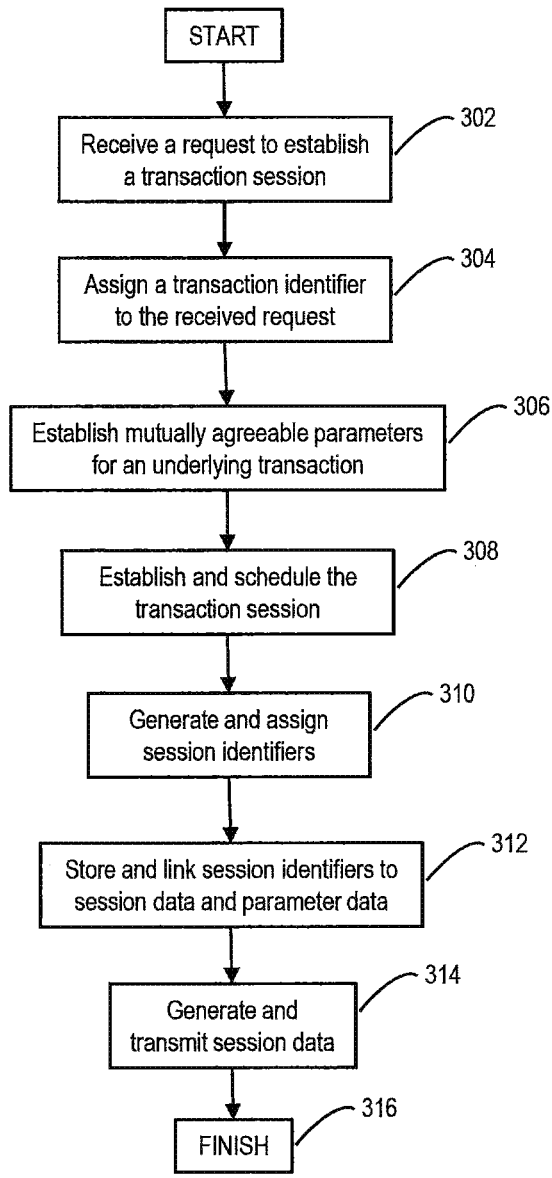
FIG. 3 is a flowchart of an exemplary process for automatically establishing and scheduling a transaction session, consistent with disclosed embodiments.

FIG. 3 is a flowchart of an exemplary process 300 for automatically establishing and scheduling a transaction session that facilitates a performance of one or more parameter-based operations, in accordance with certain disclosed embodiments. In some aspects, a computing system, e.g., transaction system 140, may perform steps of example process 300. For example, transaction system 140 may receive a request to establish a transaction session from a communications device of a first user, e.g., device 102 operated by user 101. In some instances, the requested transaction session may be associated with an underlying transaction, such as a proposed peer-to-peer (P2P) transaction in which user 101 sells or trades one or more goods or services to a second user, e.g., user 121, in exchange for an agreed-upon payment and in accordance with other agreed-upon transaction parameters.

In some aspects, and based on data generated by and exchanged between device 102 and an additional device associated with user 121, e.g., device 122, transaction system 140 may perform operations that establish one or more mutually agreeable transaction parameters for the underlying transaction, and further, that identify a trusted, third-party computing system available to host the transaction session at a time and location mutually agreeable to both parties. For instance, the trusted, third-party computing system may correspond to an automated teller machine (ATM) accessible to users 101 and 121 through corresponding personal identification numbers (PINs), such as ATM 170. Further, in certain instances, transaction system 140 may establish the transaction session by generating and assigning, to users 101 and 121, one or more session identifiers that associate users 101 and 121 with the transaction session. When provided as input to ATM 170 at the scheduled data and time, the assigned session identifiers may enable users 101 and 121 to complete the underlying P2P transaction and request a performance of one or more operations consistent with the mutually agreeable terms by ATM 170 and/or transaction system 140. By relying on trusted, third-party computing system, such as ATM 170, the disclosed embodiments may enable users 101 and 121 to conduct the trustless, P2P transaction described above in both a manner that is both physically and financially secure.

Referring to FIG. 3, transaction system 140 may receive a request to establish a secure, trusted transaction session from device 102 across a corresponding communications network, such as network 165 (e.g., in step 302). As described above, and after establishing initial contact with user 121, user 101 may access a web page or other graphical user interface (GUI) associated with transaction system 140 (e.g., a GUI generated by a mobile application provided by transaction system 140), which may be presented by device 102 through a corresponding display unit. In response to a successful authentication, the presented web page or GUI may prompt user 101 to provide input to device 102 that specifies one or more transaction parameters of the underlying transaction associated with the transaction request, e.g., the P2P transaction described above.

For example, the underlying P2P transaction may correspond to a potential purchase of user 101's hockey tickets by user 121, and user 101 may provide, to device 102 through the display unit, data that identifies the buyer of the tickets (e.g., user 121's name and contact information, such as an email address, telephone number, social-networking handle, etc.) and the one or more transaction parameters of the underlying transaction, such as the purchase price of the tickets (e.g., $150), the delivery date of the tickets (e.g., Nov. 1, 2016), and a particular payment mechanism for delivering the funds corresponding to the purchase price (e.g., a disbursement of cash by ATM 170, an electronic transfer of funds to a specific account of user 101, an e-transfer of funds to user 101, etc.). The disclosed embodiments are, however, not limited to these examples of transaction parameters and P2P transactions, and in other aspects, received request may include data identifying any additional or alternate parameters that characterize the underlying P2P transaction, or any additional or alternate underlying transaction, associated with the requested transaction session. Device 102 may receive the provided input, and as described above, may package portions of the provided input to the request to establish the transaction session, along with additional data identifying user 101 (e.g., a user name and contact information, such as an email address, telephone number, social-networking handle, etc.) and device 102 (e.g., an IP address within network 165). Device 102 may transmit request 205 to transaction system 140 across network 165 using any of the exemplary communications protocols described above.

Referring back to FIG. 3, transaction system 140 may receive the request from device 102 (e.g., in step 302), and may generate and assign a transaction identifier to the received request (e.g., in step 304). For example, transaction system 140 may extract, from the received request, data identifying the transaction parameters specified by user 101 for the underlying P2P transaction, and additionally or alternatively, data identifying user one or more counterparties to the underlying P2P transaction (e.g., user 102's name and contact information). In certain aspects, transaction system 140 may perform any of the exemplary processes described above to generate the transaction identifier, which may uniquely identify the underlying P2P transaction and the one or more parameters of that underlying P2P transaction specified by user 101.

Further, and based on portions of the received request, transaction system 140 may perform any of the exemplary processes described above to establish that one or more of the specified transaction parameters of the underlying P2P transaction are mutually agreeable to both users 101 and 121 (e.g., in step 306). For example, as described above, transaction system 140 may generate a transaction proposal that identifies the underlying P2P transaction and the one or more transaction parameters proposed by user 101 for the underlying P2P transaction, and transmit the generated transaction proposal to device 122 (e.g., as operated by user 121). Device 122 may receive the transaction proposal, and may extract data from the received transaction proposal that characterizes the underlying P2P transaction (e.g., the purchase of user 101's tickets by user 121), the parties to the proposed P2P transaction (e.g., users 101 and 121), and the one or more transaction parameters proposed for the underlying P2P transaction.

In some aspects, device 122 may present portions of the extracted data on the display unit, and may receive, via the input unit, input from user 121 that indicates an agreement to complete the proposed P2P transaction in accordance with the one or more transaction parameters specified by user 101, and additionally or alternatively, specifies a source account intended by user 121 to fund the underlying P2P transaction. Device 122 may, in some aspects, generate a response to the transaction proposal that includes data indicative of user 121's agreement to complete the underlying P2P transaction in accordance with the proposed transaction parameters, along with data identifying the specified source account of user 121, and transmit the generated response to across network 165 to transaction system 140 using any of the communications protocols described above.

Transaction system 140 may receive the transmitted response, which may be processed to detect the agreement of user 121 with the proposed transaction parameters of the underlying P2P transaction. Further, and in response to the detected agreement, transaction system 140 may perform operations establishing that one or more of the proposed transaction terms of the underlying P2P transaction are mutually agreeable to both users 101 and 121 (e.g., in step 306). For example, and as described above, the underlying P2P transaction may correspond to the purchase of user 101's hockey tickets by user 121, and the mutually agreeable transaction parameters may include, but are not limited to, the $150 purchase price, the delivery data of Nov. 1, 2016, and a specified payment mechanism that funds the $150 purchase from a financial services account specified by user 121. Further, transaction system 140 may also perform operations that store data indicative of the agreed-upon terms within one or more tangible, non-transitory memories.

Additionally, in some aspects, transaction system 140 may be configured to establish and schedule a secure, trusted transaction session during which users 101 and 121 may conduct the underlying P2P transaction in accordance with the agreed-upon transaction parameters (e.g., in step 308). For example, and as described above, transaction system 140 may access one or more tangible, non-transitory memories and obtain stored data records that specify locations and availabilities of one or more trusted computing systems, e.g., ATM 170, available to host transaction sessions on the agreed-upon delivery date of the tickets, e.g., Nov. 1, 2016. In certain aspects, transaction system 140 may be configured to generate proposed schedule data, which may identify ATM 170 and the one or more times at which ATM 170 is available to host a transaction session on November $1^{st}$ (e.g., 10:00 a.m., 12:30 p.m., and 3:45 p.m.), and may transmit the proposed schedule data across network 165 to devices 102 and 122 using any of the communications protocols described above.

Each of devices 102 and 122 may receive the proposed schedule data, and may present, through the corresponding display units, portions of proposed schedule data 251 to corresponding ones of users 101 and 121 using any of the exemplary processes described above. For example, devices 102 and 122 may present, within a web page or other GUI displayed by the corresponding interfaces, information that identifies ATM 170, its street address (e.g., 66 Wellington Street West), and its availability for the transaction session at 10:00 a.m., 12:30 p.m., and 3:45 p.m. on Nov. 1, 2016. In response to the presented information, each of users 101 and 121 may provide, to corresponding ones of devices 102 and 122 through the corresponding display units, input specifying a selection of one or more of the available times for the transaction session on November $1^{st}$.

For example, user 101 may provide input to device 102 selecting each of the available times, e.g., 10:00 a.m., 12:30 p.m., and 3:45 p.m., for the transaction session on November $1^{st}$, and device 102 may generate a response to the proposed schedule data that identifies user 101's selection of the available time slots (e.g., 10:00 a.m., 12:30 p.m., and 3:45 p.m.) and includes additional data identifying user 101 and/or device 102. In other instances, user 121 may provide input to device 122 that selects the available 10:00 a.m. time for the transaction session on November $1^{st}$, and as described above, device 122 may generate a response to the proposed schedule data that identifies user 121's selection of the available 10:00 a.m. time slot and includes additional data identifying user 121 and/or device 122. Devices 102 and 122 may transmit the generated responses across network 165 to transaction system 140 using any of the processes described above.

Referring back to FIG. 3, transaction system 140 may receive the transmitted responses and may perform operations that select a mutually agreeable time for the transaction session hosted at ATM 170 on November $1^{st}$ (e.g., in step 308). For example, and based on the received responses, transaction system 140 may determine that users 101 and 121 are both available to conduct the proposed P2P transaction during a transaction session hosted by ATM 170 at 10:00 a.m. on Nov. 1, 2016. In response to the determination, transaction system 140 may perform operations that establish a mutual agreement between users 101 and 121 regarding a time, date, and location of the scheduled transaction session, e.g., 10:00 a.m. on Nov. 1, 2016, at the physical location of ATM 170 (e.g., in step 308).

Based on the established mutual agreement, transaction system 140 may schedule the transaction session at the agreed-upon time, date, and location, and using any of the exemplary processes described above, may generate session identifiers that associate each of users 101 and 121 with the scheduled transaction session, the time, date, location of that scheduled transaction session, and as described below, the mutually agreeable transaction parameters of the underlying P2P transaction session (e.g., in step 310). In one aspect, the generated session identifiers may be session- and user-specific, and transaction system 140 may generate and assign a corresponding session identifier to each of users 101 and 121. In other aspects, and consistent with the disclosed embodiments, the generated session identifiers may be session-specific, and transaction system 140 may generate and assign a single, common session identifier to each of users 101 and 121, and to any other parties to the P2P transaction.

Additionally, transaction system 140 may perform operations that store, within structured data records of one or more tangible, non-transitory memories, scheduling data that identifies the time, date, and location of the scheduled transaction session and session data that identifies the session identifiers generated for and assigned to users 101 and 121 (e.g., in step 312). In some instances, transaction system 140 may perform additional operations that link the stored session data to the stored scheduling data, and additionally or alternatively, to the stored transaction identifier and stored parameter data within the one or more tangible, non-transitory memories. By linking the session identifiers to the transaction identifier, the mutually agreeable transaction parameters, and the mutually agreeable time, date, and location of the scheduled transaction session, each of the session identifiers assigned to users 101 and 121 may be uniquely linked to and associated with the corresponding scheduled transaction session.

Further, in step 312, transaction system 140 may perform operations that link the stored session identifier assigned to each of users 101 and 121 with a corresponding personal identification number (PIN) stored within the one or more tangible, non-transitory memories. As described above, a financial institution may assign the corresponding PIN to each of users 101 and 121, and by linking together the session identifier and the PIN assigned to each of users 101 and 121, the disclosed embodiments may establish an additional layer of security to ensure that the proposed P2P transaction is conducted by the appropriate parties during the scheduled transaction session.

Referring back to FIG. 3, and using any of the exemplary processes described above, transaction system 140 may generate, and transmit to corresponding ones of devices 102 and 122, user-specific session data that confirms the time, date, and location of the scheduled transaction session and further, specifies the session identifier assigned to the corresponding one of users 101 and 121 (e.g., in step 314). In additional aspects, transaction system 140 may generate, and transmit to ATM 170, session data that confirms the time, date, and location of the scheduled transaction session (e.g., 10:00 a.m. on Nov. 1, 2016, at ATM 170) and further, identifies the session identifiers assigned to each party to the corresponding transaction session (e.g., in step 314). ATM 170 may receive the transmitted session data, and as described above, may process and store portions of the transmitted session data (e.g., data identifying the session identifiers assigned to users 101 and 121 and scheduling data that confirms the time, date, and location of the scheduled transaction session) within one or more tangible, non-transitory memories. In some aspects, and by storing the assigned session identifiers and scheduling data within the one or more tangible, non-transitory memories, ATM 170 may confirm the scheduled transaction session at 10:00 a.m. on November 1$^{st}$, at which time users 101 and 121 may conduct the proposed P2P transaction in a secure, trusted networking and physical environment. In certain aspects, upon transmission of the user-specific session data to devices 102 and 122 (e.g., in step 312), and the session data to ATM 170 (e.g., in step 314), exemplary process 300 may be complete in step 316.

Figure 4:
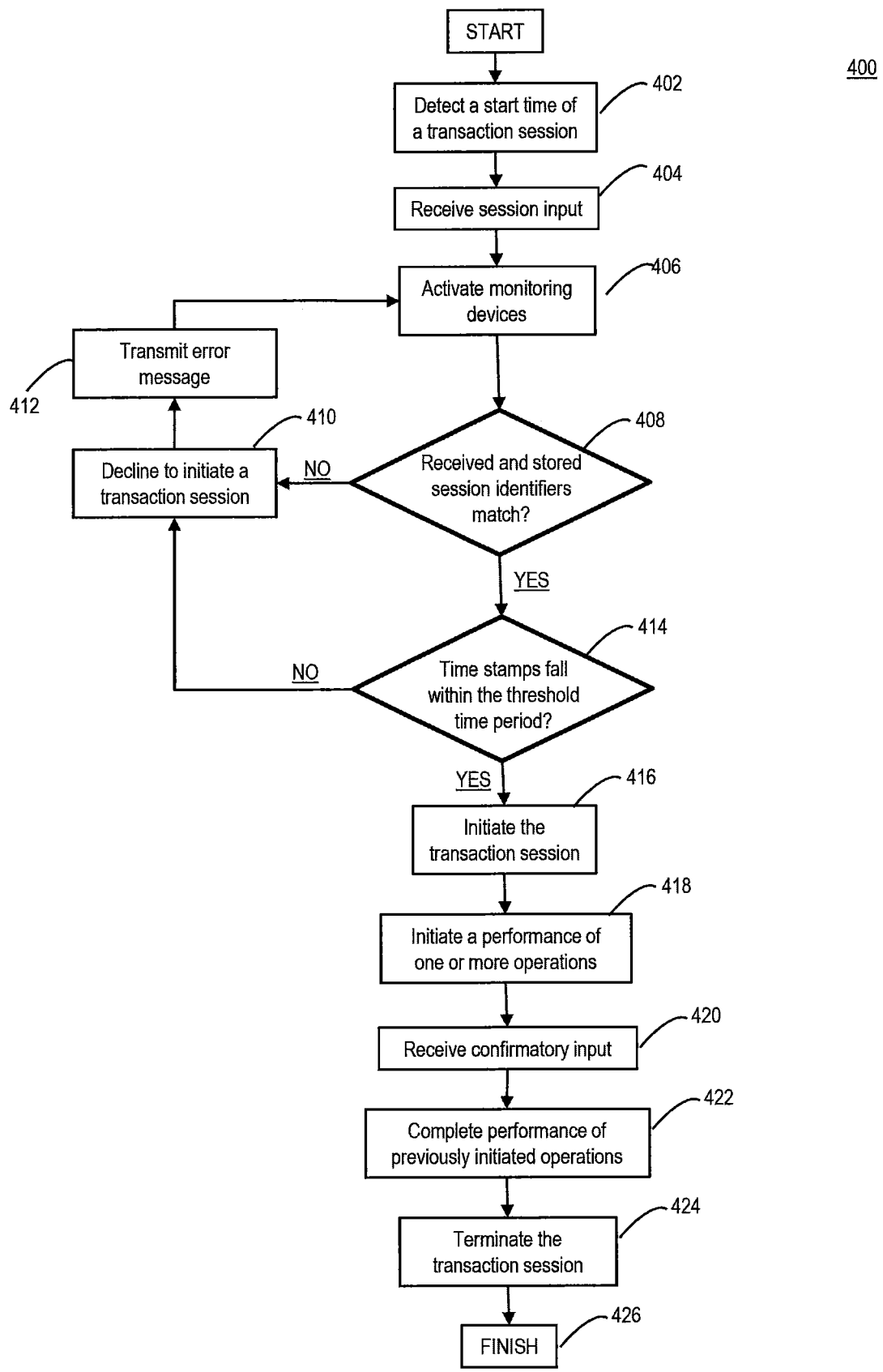
FIG. 4 is a flowchart of an exemplary process for automatically performing one or more parameter-based operations during a transaction session, consistent with disclosed embodiments.

FIG. 4 is a flowchart of an exemplary process 400 for automatically performing one or more parameter-based operations during a scheduled data exchange session, in accordance with certain disclosed embodiments. In some aspects, a trusted computing system, e.g., ATM 170, may perform steps of example process 400. For example, and as described above, the transaction session may involve one or more parties to an underlying data exchange (such as a trustless, peer-to-peer (P2P) transaction in which a buyer, e.g., user 121, agrees to purchase hockey tickets from a seller, e.g., user 101), and may occur at the physical location of ATM 170 at a specified date and time. In some aspects, a computing system, e.g., transaction system 140, may perform any of the exemplary processes described above to schedule the transaction session at time, date, and location (e.g., 10:00 a.m. on Nov. 1, 2016, at the physical location of ATM 170) that is mutually acceptable to each party to the underlying transaction, e.g., users 101 and 121, who may arrive at the specified location at the specified date and time to conduct the underlying transaction in a physically, financially, and computationally secure environment.

In some aspects, ATM 170 may detect a start time associated with a previously scheduled transaction session (e.g., in step 402). For example, ATM 170 may store, within one or more tangible, non-transitory memories, data specifying at 10:00 a.m. start time on Nov. 1, 2016, fora scheduled transaction session involving users 101 and 121 and associated with one or more of the exemplary P2P transactions described above. Based on portions of the stored data, ATM 170 may detect the 10:00 a.m. start time, and in response to the detected start time, perform operations that generate and present, through display unit 176B, a graphical user interface (GUI) that prompts users 101 and/or 121 to provide input identifying corresponding ones of assigned session identifiers (e.g., in step 404). In certain instances, transaction system 140 may generate and assign the session identifiers to corresponding ones of users 101 and 121 using any of the exemplary processes described above.

In certain aspects, each of users 101 and 121 may provide a corresponding session identifier as input to input unit 176B of ATM 170, which includes, but is not limited to a keypad or a pressure-sensitive touchscreen display. ATM 170 may receive input data identifying the corresponding session identifiers and additionally or alternatively, time stamps indicative of times at which users 101 and 121 provided the corresponding session identifiers to input unit 176B (e.g., in step 404). In response to the received input data, ATM 170 may generate one or more electronic commands that activate an embedded digital camera and microphone, which may be configured to capture digital video, image, and/or audio data indicative of an interaction of users 101 and 121 during the scheduled transaction session (e.g., in step 406). By capturing digital video, image, and/or audio data during the scheduled transaction session, the disclosed embodiments may provide, via ATM 170, a safe, secure, and trusted environment for completing trustless transactions between potentially unknown parties, such as users 101 and 121.

In further aspects, and using any of the processes described above, ATM 170 may be configured to validate each of the corresponding identifiers provided by users 101 and 121 as input to input unit 1766. For example, ATM 170 may process the received input data to extract the corresponding session identifiers, and further, the data identifying the time stamps associated with each of the corresponding session identifiers. In one aspect, ATM 170 may perform operations that compare each of the started session identifiers against the stored session identifiers assigned to the scheduled transaction session (e.g., as include within session data received from transaction system and as stored within the one or more tangible, non-transitory memories, such as data repository 174), and determine whether the received session identifiers match corresponding ones of the stored session identifiers (e.g., in step 408)

If ATM 170 were to determine that one or more of the received session identifiers fail to match the corresponding ones of the stored session identifiers, ATM 170 may deem the received session identifiers invalid for the scheduled transaction session (e.g., step 408; NO), and may decline to validate the received session identifiers and to initiate the transaction session (e.g., step 410). In some aspects, ATM 170 may also present an error message to users 101 and 121 on display unit 176A (e.g., in step 412). For example, presented error message identifying one or more of users 101 or 121 associated with the invalid session identifier or identifiers, and may prompt users 101 and 121 to provide additional input identifier the assigned session identifiers. In some aspects, exemplary process 400 may pass back to step 406, in which ATM 170 awaits additional user input.

If, however, ATM 170 were to determine that the received session identifiers match to those assigned to the scheduled transaction system (e.g., step 408; YES), ATM 170 may determine whether the time stamp of each of the received session identifiers falls within a threshold time period of the start time of the scheduled transaction session (e.g., in step 414). As described above, the threshold time period may correspond to five minutes, ten minutes, thirty minutes, or any additional or alternate predetermined or adaptively determined time period appropriate to ATM 170 and/or transaction system 140.

If ATM 170 were to determine that one or more of the time stamps fall outside the threshold time period of the scheduled start time (e.g., step 414; NO), exemplary process 300 may pass back to step 410. In some aspects, ATM 170 may decline to validate the received session identifiers and to initiate the transaction session, and may present an error message to users 101 and 121 through the corresponding interface, as described above. By declining to authentication transaction sessions associated with delayed (or premature) sessions identifiers, the disclosed embodiments may reduce a potential for fraud by third parties that may obtain unauthorized access to a session identifier assigned to one or more parties to a particular transaction session.

Alternatively, if ATM 170 were to determine that each of the time stamps fall within the threshold time period of the scheduled start time (e.g., step 414; YES), ATM 170 may validate the received session identifiers and perform operations that initiate the transaction session between users 101 and 121 (e.g., in step 416). For example, in step 416, ATM 170 may present, to users 101 and 121 on display unit 176A, information confirming the validation of the received session identifiers and the initiation of the transaction session. In some aspects, the presented information may prompt users 101 and 121 to conduct the underlying P2P transaction in accordance with the agreed-upon transaction parameters, and upon completion of the underlying P2P transaction, to provide additional input to the corresponding input unit that characterizes a satisfaction of each of users 101 and 121 with the underlying transaction, as described below.

In certain embodiments, ATM 170 may validate the received session identifiers based on locally stored data that specifies of the session identifiers previously assigned to users 101 and 121 and to the scheduled transaction session and further, the starting time, date, and location of the scheduled transaction session (e.g., in steps 408-416). In other aspects, and consistent with the disclosed embodiments, ATM 170 may perform one or more operations that delegate the validation of the received session identifiers to one or more additional computing systems accessible across network 165, such as transaction system 140. For example, ATM 170 may generate a session authentication request, that includes the session identifiers provided by users 101 and/or 121, time stamps at which ATM 170 received each of the session identifiers, and additionally or alternatively, data identifying users 101 and/or 121. ATM 170 may, in certain instances, transmit the session authentication request 279 across network 165 to transaction system 140.

In some aspects, transaction system 140 may perform any of the exemplary processes described above to confirm the received session identifiers correspond to the session identifiers previously assigned to users 101 and 121 and to the scheduled transaction session, and further, to verify that the times stamps characterizing the receipt of the session identifiers at ATM 170 fall within the threshold time period of the start time of the scheduled transaction system. Based on the outcome of these confirmation and verification processes, and as described above, transaction system 140 may generate, and transmit to ATM 170, an authentication confirmation that indicates a validity of the received session identifiers (e.g., that the received session identifiers correspond to the previously assigned session identifiers and that the time stamps fall within the threshold time period of the start time of the scheduled transaction session) or an invalidity of the received session identifiers (e.g., that one or more of received session identifiers do not correspond to the previously assigned session identifiers, or that one or more of the time stamps fall outside the threshold time period of the start time of the scheduled transaction session). ATM 170 may receive the authentication confirmation, the contents of which may cause ATM 170 to initiate the scheduled transaction session (e.g., in step 416) or decline to initiate the scheduled transaction session (e.g., in step 410).

Referring back to FIG. 4, and in response to the initiated transaction session, ATM 170 may be configured to initiate a performance of one or more operations triggered by a completion of the scheduled transaction session, and additionally or alternatively, a conclusion to the underlying P2P transaction that would be mutually satisfactory to users 101 and 121 (e.g., in step 418). For example, and as described above, the agreed-upon transaction parameters for the underlying P2P transaction (i.e., the sale to user 121 of hockey tickets held by user 101) may identify an agreed-upon payment (e.g., a $150 payment) and may identify a source account specified by user 121 to fund the agreed-upon payment (e.g., an account number and/or a routing number assigned to user 121's checking account by a corresponding financial institution). In some aspects, and in step 418, ATM 170 may be configured to initiate operations that transfer $150 in funds from the checking account of user 121 to an escrow account at the corresponding financial institution pending a mutually satisfactory conclusion of the underlying P2P transaction, or alternatively, operations that place restrict an ability of user 121 to withdraw the $150 payment from the checking account (e.g., to place a "hold" on user 121's checking account in the amount of $150).

For example, in step 418, ATM 170 may generate, and transmit to transaction system 140 across network 165, a transaction initiation request that identifies the specified source account and requests that at least $150 within that specified source account be placed in escrow (placed on hold) until a mutually satisfactory conclusion of the underlying P2P transaction. Transaction system 140 may receive the transaction initiation request, and may perform any of the exemplary processes described above to place a hold on at least $150 within user 121's checking account, and additionally or alternatively, to withdraw funds in the amount of $150 from user 121's checking account and transfer with withdrawn funds into an escrow account associated with the corresponding financial institution (or one or more additional financial institutions, such as those that maintain transaction system 140). Transaction system 140 may, in some instances, transmit a confirmation of the escrowed or held funds to ATM 170, which may receive the confirmation in step 420.

In some aspects, and upon initiating the performance of the one or more operations, ATM 170 may receive, through the input unit 1766, additional input from users 101 and/or 121 indicative of a mutually satisfactory conclusion of the underlying P2P transaction associated with the scheduled transaction session (e.g., in step 420). For example, while disposed proximate to the physical location of ATM 170, and while being monitored by the digital camera and/or microphone, user 101 may provide physical copies of the tickets to user 121, who may inspect the tickets and confirm their authenticity (e.g., based on certain anti-counterfeiting features incorporated into the tickets, such as holographic inserts, embedded watermarks, etc.). Based on the inspection and confirmation, user 121 may express to user 101 a satisfaction with the exchanged tickets and a desire to complete the P2P transaction by in accordance with the agreed-upon terms, e.g., by providing funds in the amount of $150.

Based on the expressed satisfaction with the exchanged tickets, user 121 may provide additional input to ATM 170 that confirms the mutually satisfactory conclusion of the underlying P2P transaction and requests that ATM 170 transfer the $150 payment to user 101 in accordance with the user-specified payment mechanism. In additional or alternate aspects, user 101 may also provide to ATM 170 data that confirms the mutually satisfactory completion of the underlying P2P transaction, and additionally or alternatively, data that confirms a payment mechanism selected by user 101 to receive the agreed-upon payment (e.g., based on a menu of potential payment mechanism presented by display unit 176B within a corresponding GUI). By way of example, the additional confirmatory input may include, but is not limited to, personal identifiers or PINs that uniquely identify corresponding ones of users 101 and 121 and further, that enables users 101 and 121 to access ATM 170, and further, the potential payment mechanisms may include, but are not limited to, a disbursement of cash by ATM 170, an electronic funds transfer from the checking account of user 121 to a checking account of user 101, and a e-transfer to user 101 via email or text message.

In response to the receipt of the confirmatory input, ATM 170 may be configured to complete the previously initiated performance of the one or more operations (e.g., in step 422). For example, and as described above in reference to step 420, ATM 170 initiated the agreed-upon payment transaction in the amount of $150 by placing a hold on and agreed-upon $150 payment within user 121's checking account, or alternatively, by transferring the agreed-upon $150 payment from user 121's checking account to the escrow account. In some aspects, ATM 170 may perform additional operations in step 424 to complete the initiated payment transaction in accordance with the payment mechanism specified by user 101 (e.g., within the received request to establish the transaction session and/or within the confirmatory input, as described above).

For example, ATM 170 may generate, and transmit to transaction system 140, a transaction completion request that includes the received confirmatory input (e.g., the received PINs of users 101 and 121) and data identifying the payment mechanism specified by user 101 (e.g., the disbursement of cash by ATM 170 to reflect the agreed-upon payment). Transaction system 140 may receive the transaction completion request, and may perform any of the exemplary processes described above to validated the received PINs (e.g., based on data indicative of the PINs previously assigned to users 101 and 121, as stored within one or more tangible, non-transitory memories), and to execute and/or settle the previously initiated transaction in accordance with the specified payment mechanism. For example, and based on the transaction completion request, transaction system 140 may determine that the specified payment mechanism corresponds to a distribution of cash by ATM 170, and may perform operations, such as those described above, that liquidate the $150 previously transferred to the escrow account and generate a transaction confirmation that, when received by ATM 170, may cause ATM 170 to disburse cash equivalent to the agreed-upon payment of $150.

In some aspects, ATM 170 may receive the transaction confirmation from transaction system 140, and in response to the received transaction confirmation, may present a confirmation of the mutually satisfactory conclusion of the underlying P2P transaction and the upcoming disbursement of the $150 cash payment to user 101 (e.g., in step 422). Further, in step 424, ATM 170 may generate one or more electronic commands that, when received by corresponding electro-mechanism components of ATM 170, case these components to meter out and disburse the $150 cash payment to user 101.

Further, and upon completing the one or more operations triggered by the conclusion of the underlying P2P transaction (e.g., in step 422), ATM 170 may perform additional operations to terminate the transaction session (e.g., in step 424). For example, ATM 170 may generate one or more electronic commands that de-activate the embedded digital camera and microphone, which may cease capturing the digital video, image, and/or audio data indicative of an interaction of users 101 and 121 during the now-terminated transaction session. In some aspects, exemplary process 400 is then complete in step 426.

III. Exemplary Hardware and Software Implementations

Embodiments of the subject matter and the functional operations described in this specification can be implemented in digital electronic circuitry, in tangibly-embodied computer software or firmware, in computer hardware, including the structures disclosed in this specification and their structural equivalents, or in combinations of one or more of them. Embodiments of the subject matter described in this specification, including parameter negotiation module 242, parameter confirmation module 246, session scheduling module 249, initiation modules 202, 222, and 272, session negotiation module 248, session confirmation modules 208, 228, and 253, scheduling modules 206 and 226, session authentication module 278, transaction initiation module 282, transaction completion module 285, authentication module 259, session management module 261, and transaction processing module 264, can be implemented as one or more computer programs, i.e., one or more modules of computer program instructions encoded on a tangible non-transitory program carrier for execution by, or to control the operation of, data processing apparatus. Additionally or alternatively, the program instructions can be encoded on an artificially-generated propagated signal, such as a machine-generated electrical, optical, or electromagnetic signal that is generated to encode information for transmission to suitable receiver apparatus for execution by a data processing apparatus. The computer storage medium can be a machine-readable storage device, a machine-readable storage substrate, a random or serial access memory device, or a combination of one or more of them.

The term "data processing apparatus" refers to data processing hardware and encompasses all kinds of apparatus, devices, and machines for processing data, including by way of example a programmable processor, a computer, or multiple processors or computers. The apparatus can also be or further include special purpose logic circuitry, such as an FPGA (field programmable gate array) or an ASIC (application-specific integrated circuit). The apparatus can optionally include, in addition to hardware, code that creates an execution environment for computer programs, such as code that constitutes processor firmware, a protocol stack, a database management system, an operating system, or a combination of one or more of them.

A computer program, which may also be referred to or described as a program, software, a software application, a module, a software module, a script, or code, can be written in any form of programming language, including compiled or interpreted languages, or declarative or procedural languages, and it can be deployed in any form, including as a stand-alone program or as a module, component, subroutine, or other unit suitable for use in a computing environment. A computer program may, but need not, correspond to a file in a file system. A program can be stored in a portion of a file that holds other programs or data, such as one or more scripts stored in a markup language document, in a single file dedicated to the program in question, or in multiple coordinated files, such as files that store one or more modules, sub-programs, or portions of code. A computer program can be deployed to be executed on one computer or on multiple computers that are located at one site or distributed across multiple sites and interconnected by a communication network.

The processes and logic flows described in this specification can be performed by one or more programmable computers executing one or more computer programs to perform functions by operating on input data and generating output. The processes and logic flows can also be performed by, and apparatus can also be implemented as, special purpose logic circuitry, such as an FPGA (field programmable gate array) or an ASIC (application-specific integrated circuit).

Computers suitable for the execution of a computer program include, by way of example, general or special purpose microprocessors or both, or any other kind of central processing unit. Generally, a central processing unit will receive instructions and data from a read-only memory or a random access memory or both. The essential elements of a computer are a central processing unit for performing or executing instructions and one or more memory devices for storing instructions and data. Generally, a computer will also include, or be operatively coupled to receive data from or transfer data to, or both, one or more mass storage devices for storing data, such as magnetic, magneto-optical disks, or optical disks. However, a computer need not have such devices. Moreover, a computer can be embedded in another device, such as a mobile telephone, a personal digital assistant (PDA), a mobile audio or video player, a game console, a Global Positioning System (GPS) receiver, or a portable storage device, such as a universal serial bus (USB) flash drive, to name just a few.

Computer-readable media suitable for storing computer program instructions and data include all forms of non-volatile memory, media and memory devices, including by way of example semiconductor memory devices, such as EPROM, EEPROM, and flash memory devices; magnetic disks, such as internal hard disks or removable disks; magneto-optical disks; and CD-ROM and DVD-ROM disks. The processor and the memory can be supplemented by, or incorporated in, special purpose logic circuitry.

To provide for interaction with a user, embodiments of the subject matter described in this specification can be implemented on a computer having a display device, such as a CRT (cathode ray tube) or LCD (liquid crystal display) monitor, for displaying information to the user and a keyboard and a pointing device, such as a mouse or a trackball, by which the user can provide input to the computer. Other kinds of devices can be used to provide for interaction with a user as well; for example, feedback provided to the user can be any form of sensory feedback, such as visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's device in response to requests received from the web browser.

Implementations of the subject matter described in this specification can be implemented in a computing system that includes a back-end component, such as a data server, or that includes a middleware component, such as an application server, or that includes a front-end component, such as a client computer having a graphical user interface or a Web browser through which a user can interact with an implementation of the subject matter described in this specification, or any combination of one or more such back-end, middleware, or front-end components. The components of the system can be interconnected by any form or medium of digital data communication, such as a communication network. Examples of communication networks include a local area network (LAN) and a wide area network (WAN), such as the Internet.

The computing system can include clients and servers. A client and server are generally remote from each other and typically interact through a communication network. The relationship of client and server arises by virtue of computer programs running on the respective computers and having a client-server relationship to each other. In some implementations, a server transmits data, such as an HTML page, to a user device, such as for purposes of displaying data to and receiving user input from a user interacting with the user device, which acts as a client. Data generated at the user device, such as a result of the user interaction, can be received from the user device at the server.

While this specification contains many specifics, these should not be construed as limitations on the scope of the invention or of what may be claimed, but rather as descriptions of features specific to particular embodiments of the invention. Certain features that are described in this specification in the context of separate embodiments may also be implemented in combination in a single embodiment. Conversely, various features that are described in the context of a single embodiment may also be implemented in multiple embodiments separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems may generally be integrated together in a single software product or packaged into multiple software products.

In each instance where an HTML file is mentioned, other file types or formats may be substituted. For instance, an HTML file may be replaced by an XML, JSON, plain text, or other types of files. Moreover, where a table or hash table is mentioned, other data structures (such as spreadsheets, relational databases, or structured files) may be used.

While this specification contains many specifics, these should not be construed as limitations, but rather as descriptions of features specific to particular implementations. Certain features that are described in this specification in the context of separate implementations may also be implemented in combination in a single implementation. Conversely, various features that are described in the context of a single implementation may also be implemented in multiple implementations separately or in any suitable sub-combination. Moreover, although features may be described above as acting in certain combinations and even initially claimed as such, one or more features from a claimed combination may in some cases be excised from the combination, and the claimed combination may be directed to a sub-combination or variation of a sub-combination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the implementations described above should not be understood as requiring such separation in all implementations, and it should be understood that the described program components and systems may generally be integrated together in a single software product or packaged into multiple software products.

Various embodiments have been described herein with reference to the accompanying drawings. It will, however, be evident that various modifications and changes may be made thereto, and additional embodiments may be implemented, without departing from the broader scope of the disclosed embodiments as set forth in the claims that follow.

Further, other embodiments will be apparent to those skilled in the art from consideration of the specification and practice of one or more embodiments of the present disclosure. It is intended, therefore, that this disclosure and the examples herein be considered as exemplary only, with a true scope and spirit of the disclosed embodiments being indicated by the following listing of exemplary claims.

What is claimed is:

1. An apparatus, comprising:
    an input unit;
    a storage unit storing instructions; and
    at least one processor coupled to the input unit, and the storage unit, the at least one processor being configured to execute the instructions to:
        through the input unit, receive first input data from a first party associated with a data exchange session and receive second data from a second party associated with the data exchange session, the first input data comprising a first identifier of the first party, the second input data comprising a second identifier of the second party, the first input data being associated with a first receipt time and the second input data being associated with a second receipt time, and the first party and the second party being disposed at a physical location of the apparatus, the apparatus being associated with a trusted, third-party computing network;
        receive, from a computing system across a communications network, confirmation data indicative of a validity of the first session identifier and of the second session identifier, and validate the first identifier and the second identifier based on at least a portion of the confirmation data;
        determine that each of the first and second receipt times fall within a threshold time period of a scheduled start time of the data exchange session;
        establish the data exchange session based on the determination that each of the first and second receipt times fall within the threshold time period of the scheduled start time of the data exchange session, and based on the validation of the first identifier and the second identifier;
        receive, through the input unit, third input data that confirms a completion of a first operation associated with the data exchange session, and based on the third input data, initiate a performance of a second operation associated with the data exchange session, the first operation comprising an exchange of a good or service between the first party and the second party and the second operation comprising a transaction involving the first party and the second party; and
        detect a completion of the performance of the second operation, and terminate the data exchange session based on the detected completion.

2. The apparatus of claim 1, wherein the at least one processor is further configured to execute the instructions to:
    request, from the computing system, the confirmation data indicative of the validity of the first session identifier and of the second session identifier;
    validate the first session identifier and the second session identifier based on the portion of the confirmation data, and based on the determination that the first and second receipt times fall within the threshold time period of the scheduled start time.

3. The apparatus of claim 2, wherein:
    the data exchange session is associated with a transaction identifier;
    the confirmation data associates the transaction identifier with the first and second session identifiers; and
    the at least one processor is further configured to execute the instructions to establish the data exchange session based on the validation of the first and second session identifiers, and based on the association between the transaction identifier and the first and second session identifiers.

4. The apparatus of claim 2, wherein the at least one processor is further configured to execute the instructions to:
    obtain data identifying a first assigned session identifier of the first party and a second assigned session identifier of the second party;
    determine that the first session identifier corresponds to the first assigned session identifier, and determine that the second session identifier corresponds to the second assigned session identifier; and
    establish the validity of the first and second session identifiers based on the determination that the first session identifier corresponds to the first assigned session identifier and that the second session identifier corresponds to the second session identifier, and based on the confirmation data.

5. The apparatus of claim 1, wherein:
    the first and second parties are disposed at the physical location of the apparatus at the scheduled start time;
    the apparatus further comprises a digital camera coupled to the at least one processor; and
    the at least one processor is further configured to execute the instructions to:
        generate an electronic command that, when received by the digital camera, causes the digital camera to capture digital video or image data indicative of an environment surrounding the apparatus;
        detect a completion of the data exchange session; and
        based on the detected completion of the data exchange session, generate an additional electronic command that, when received by the digital camera, causes the digital camera to cease capturing the digital video or image data.

6. The apparatus of claim 1, wherein the apparatus is an automated teller machine, and the first and second parties are disposed at a physical location of the automated teller machine.

7. The apparatus of claim 6, wherein:
    the at least one processor is further configured to execute the instructions to receive the third input data from the second party through the interface unit; and
    the third input data comprises a personal identification number of the second party.

8. The apparatus of claim 1, wherein:
    the first operation is characterized by values of one or more first parameter values, and the second operation is characterized by one or more second parameter values;
    the third input data confirms a completion of the exchange of the good or service in accordance with the one or more first parameter values; and
    the at least one processor is further configured to execute the instructions to, based on the third input data, initiate the transaction in accordance with the one or more second parameter values.

9. The apparatus of claim 1, wherein the input unit comprises further comprising a near-field communications interface, the near-field communication interface being coupled to the at least one processor, and the at least one processor being further configured to execute the instructions to:
- receive, via the near-filed communications interface, at least one of the first input data from a first device operable by the first party or the second input data from a second device operably by the second party; and
- receive, via the near-filed communications interface the third input data from the first device or the second device.

10. The apparatus of claim 1, wherein the trusted computing network comprises an automated-teller machine network.

11. A computer-implemented method, comprising:
- using at least one processor of an apparatus, and through an input unit of the apparatus, receiving first input data from a first party associated with a data exchange session and receiving second data from a second party associated with the data exchange session, the first input data comprising a first identifier of the first part the second input data comprising a second identifier of the second party, the first input data being associated with a first receipt time and the second input data being associated with a second receipt time, and the first party and the second party being disposed at a physical location of the apparatus, the apparatus being associated with a trusted computing network;
- using the at least one processor, receiving across a communications network, confirmation data indicative of a validity of the first session identifier and of the second session identifier from a computing system, and validating the first identifier and the second identifier based on at least a portion of the confirmation data;
- determining, using the at least one processor, that each of the first and second receipt times fall within a threshold time period of a scheduled start time of the data exchange session;
- establishing, using the at least one processor, the data exchange session based on at least the determination that the first and second receipt times fall within the threshold time period of the scheduled start time of the data exchange session, and based on the validation of the first identifier and the second identifier;
- receiving, using the at least one processor, third input data through the input unit that confirms a completion of a first operation associated with the data exchange session, and based on the third input data, initiate a performance of a second operation associated with the data exchange session, the first operation comprising an exchange of a good or service between the first party and the second party, and the second operation comprising a transaction involving the first party and the second party;
- detecting, using the at least one processor, a completion of the performance of the second operation and based on the detected completion, terminating the data exchange session using the at least one processor.

12. The computer-implemented method of claim 11, wherein:
- the computer-implemented method further comprises:
  - using the at least one processor, requesting, from the computing system, the confirmation data indicative of the validity of the first session identifier and of the second session identifier; and
  - validating, using the at least one processor, the first session identifier and the second session identifier based on the portion of the confirmation data, and based on the determination that the first and second receipt times fall within the threshold time period of the scheduled start time.

13. The computer-implemented method of claim 12, further comprising:
- obtaining, using the at least one processor, data identifying a first assigned session identifier of the first party and a second assigned session identifier of the second party;
- determining, using the at least one processor, that the first session identifier corresponds to the first assigned session identifier, and determine that the second session identifier corresponds to the second session identifier; and
- establishing, using the at least one processor, the validity of the first and second session identifiers based on the determination that the first session identifier corresponds to the first assigned session identifier and that the second session identifier corresponds to the second session identifier, and based on the confirmation data.

14. The computer-implemented method of claim 11, wherein:
- the first and second parties are disposed at the physical location associated with the apparatus at the scheduled start time; and
- the computer-implemented method further comprises:
  - generating, using the at least one processor, an electronic command that, when received by a digital camera coupled to the at least one processor, causes the digital camera to capture digital video or image data indicative of an environment surrounding the digital camera;
  - detecting, using the at least one processor, a completion of the data exchange session using the at least one processor; and
  - based on a detected completion of the data exchange session, generating, using the at least one processor, an additional electronic command that, when received by the digital camera, causes the digital camera to cease capturing the digital video or image data.

15. The computer-implemented method of claim 11, wherein:
- the apparatus is an automated teller machine;
- the receiving comprises receiving the third input data from the input unit of the automated teller machine, the interface unit being coupled to the at least one processor; and
- the first and second parties are disposed at a physical location of the automated teller machine.

16. The computer-implemented method of claim 15, wherein:
- the receiving further comprises receiving the third input data from the second party through the interface unit; and
- the third input data comprises a personal identification number of the second party.

17. The computer-implemented method of claim 11, wherein:
- the first operation is characterized by values of one or more first parameter values, and the second operation is characterized by one or more second parameter values;
- the third input data confirms a completion of the exchange of the good or service in accordance with the one or more first parameter values; and
- the computer-implemented method further comprises, based on the third input data, and using the at least one processor, initiating the transaction in accordance with the one or more second parameter values.

18. A tangible, non-transitory computer-readable medium storing instructions that, when executed by at least one processor, cause the at least one processor to perform a method, comprising:

through an input unit of an apparatus, receiving first input data from a first party associated with a data exchange session and receiving second data from a second party associated with the data exchange session, the first input data comprising a first identifier of the first party the second input data comprising a second identifier of the second party, the first input data being associated with a first receipt time and the second input data being associated with a second receipt time, and the first party and the second party being disposed at a physical location of the apparatus, the apparatus being associated with a trusted computing network;

receiving, across a communications network, confirmation data indicative of a validity of the first session identifier and of the second session identifier from a computing system, and validating the first identifier and the second identifier based on at least a portion of the confirmation data;

determining that each of the first and second receipt times fall within a threshold time period of a scheduled start time of the data exchange session;

establishing the data exchange session based on at least the determination that (i) the first and second receipt times fall within the threshold time period of the scheduled start time of the data exchange session, and based on the validation of the first identifier and the second identifier;

receiving third input data that confirms a completion of a first operation associated with the data exchange session through the input unit, and based on the third input data, initiate a performance of a second operation associated with the data exchange session, the first operation comprising an exchange of a good or service between the first party and the second party, and the second operation comprising a transaction involving the first party and the second party; and detecting, using the at least one processor, a completion of the performance of the second operation, and terminating the data exchange session based on the detected completion.

* * * * *